(12) United States Patent
Wulich et al.

(10) Patent No.: US 6,272,072 B1
(45) Date of Patent: Aug. 7, 2001

(54) UNDERWATER COMMUNICATION METHOD, DEVICE, AND SYSTEM UTILIZING A DOPPLER FREQUENCY SHIFT

(75) Inventors: Dov Wulich, Meitar; Leo Rakhovitz, Beer-Sheva, both of (IL)

(73) Assignee: Wulich Wave Ltd., Omer (IL)

( * ) Notice: Subject to any disclaimer, the term of this patent is extended or adjusted under 35 U.S.C. 154(b) by 0 days.

(21) Appl. No.: 09/468,615

(22) Filed: Dec. 21, 1999

Related U.S. Application Data

(63) Continuation-in-part of application No. 09/277,476, filed on Mar. 26, 1999, now abandoned, which is a continuation-in-part of application No. 09/134,597, filed on Aug. 14, 1998, now Pat. No. 6,125,080.
(60) Provisional application No. 60/133,729, filed on May 12, 1999.

(51) Int. Cl.⁷ .............................. G01S 3/80; H04B 11/00
(52) U.S. Cl. ..................... 367/124; 367/118; 367/134; 367/910; 73/178 R
(58) Field of Search ..................... 367/118, 124, 367/125, 134, 131, 910; 73/178 R; 340/850; 342/418, 419, 428, 443

(56) References Cited

U.S. PATENT DOCUMENTS

| | | | |
|---|---|---|---|
| 4,103,279 | * 7/1978 | Dildy, Jr. et al. ................. | 73/178 R |
| 5,077,703 | * 12/1991 | Strauss .............................. | 367/118 |
| 5,784,339 | * 7/1998 | Woodsum et al. ................. | 367/134 |
| 6,029,515 | * 2/2000 | Lahteenmaki et al. ............ | 73/178 R |
| 6,125,080 | * 9/2000 | Sonnenschein et al. .......... | 367/134 |

* cited by examiner

Primary Examiner—Ian J. Lobo
(74) Attorney, Agent, or Firm—Stroock & Stroock & Lavan LLP

(57) ABSTRACT

An underwater communication method, device, and system that enables bi-directional communication between and among under-water divers. In accordance with the present invention, messages may be transmitted and received between and among the divers in a network and/or between divers and a diving boat, buoy, or other reference point. The present invention also permits one or more divers to receive a homing signal and to move toward the source of that signal using an acquisition and tracking feature and functionality that utilizes a Doppler frequency shift and preferably a compass to determine the distance and direction of the source of the signal. The present invention also enables a diver in distress to broadcast a distress signal (i.e., SOS) that is received by every other diver within a predetermined distance from the distressed diver. The divers receiving the distress signal are then able to locate and rescue the distressed diver using the acquisition and tracking feature and functionality.

58 Claims, 18 Drawing Sheets

FIG.8     FIG.9

| 4 BITS | 4 BITS | 4 BITS |
|---|---|---|
| M | S | A |
| | | →TIME |
| UNCODED BINARY WORD | (7,4,3) | (15,4,6) |
| 1 | 00 | 0000 |
| 2 | 0B | 0F59 |
| 3 | 16 | 1EB2 |
| 4 | 1D | 11EB |
| 5 | 2C | 3D64 |
| 6 | 27 | 323D |
| 7 | 3A | 23D6 |
| 8 | 31 | 2C8F |
| 9 | 58 | 7AC8 |
| 10 | 53 | 7591 |
| 11 | 4E | 647A |
| 12 | 45 | 6B23 |
| 13 | 74 | 47AC |
| 14 | 7F | 48F5 |
| 15 | 62 | 591E |
| 16 | 69 | 5647 |

| SOS AND NETWORK 1 FREQUENCIES | | | | | |
|---|---|---|---|---|---|
| $f_{sos}$ (Hz) | $f_{T1}$ | $f_1^{(0)}$ | $f_{c1}$ | $f_1^{(1)}$ | $f_{H1}$ |
| 40,400 | 42,200 | 42,440 | 42,560 | 42,680 | 43,160 |
| SOS AND NETWORK 2 FREQUENCIES | | | | | |
| $f_{sos}$ (Hz) | $f_{T2}$ | $f_2^{(0)}$ | $f_{c2}$ | $f_2^{(1)}$ | $f_{H2}$ |
| 40,400 | 44,600 | 44,840 | 44,960 | 45,080 | 45,560 |
| SOS AND NETWORK 3 FREQUENCIES | | | | | |
| $f_{sos}$ (Hz) | $f_{T3}$ | $f_3^{(0)}$ | $f_{c3}$ | $f_3^{(1)}$ | $f_{H3}$ |
| 40,400 | 47,000 | 47,240 | 47,360 | 47,480 | 47,960 |
| SOS AND NETWORK 4 FREQUENCIES | | | | | |
| $f_{sos}$ (Hz) | $f_{T4}$ | $f_4^{(0)}$ | $f_{c4}$ | $f_4^{(1)}$ | $f_{H4}$ |
| 40,400 | 49,400 | 49,640 | 49,760 | 49,880 | 50,360 |
| SOS AND NETWORK 5 FREQUENCIES | | | | | |
| $f_{sos}$ (Hz) | $f_{T5}$ | $f_5^{(0)}$ | $f_{c5}$ | $f_5^{(1)}$ | $f_{H5}$ |
| 40,400 | 51,800 | 52,040 | 52,160 | 52,280 | 52,760 |

FIG.10

|  | $\Theta(k)$ (DEGREES) | $\lvert\Theta(k)-\Theta(k-1)\rvert$ (DEGREES) | RUNNING TOTAL $\sum_{n=k-1} \lvert\Theta(k)-\Theta(k-1)\rvert$ (DEGREES) |
|---|---|---|---|
| $\Theta(1)$ | 83 |  | 0 |
| $\Theta(2)$ | 125 | 42 | 42 |
| $\Theta(3)$ | 177 | 52 | 94 |
| $\Theta(4)$ | 248 | 71 | 165 |
| $\Theta(5)$ | 281 | 33 | 198 |
| $\Theta(6)$ | 329 | 48 | 246 |
| $\Theta(7)$ | 30 (390) | 61 | 307 |
| $\Theta(8)$ | 95 | 65 | 372 |

FIG.19

| VELOCITY VARIATION [%] | STANDARD DEVIATION OF THE AZIMUTH [deg] |
|---|---|
| 30 | 8 |
| 20 | 7 |
| 10 | 6 |
| 5 | 4 |
| 2.5 | 3 |

FIG.20

UNDERWATER COMMUNICATION METHOD, DEVICE, AND SYSTEM UTILIZING A DOPPLER FREQUENCY SHIFT

CROSS-REFERENCE TO RELATED APPLICATIONS

This application is a continuation-in-part of U.S. application Ser. No. 09/134,597, filed Aug. 14, 1998, U.S. Pat. No. 6,125,080, and is also is a continuation-in-part of U.S. application Ser. No. 09/277,476, filed Mar. 26, 1999, now abandoned. This application also claims priority of U.S. Provisional Application No. 60/133,729, filed May 12, 1999.

FIELD OF THE INVENTION

The present invention relates to the field of underwater communication and, more specifically, to an underwater communication method, device, and system that enables bi-directional communication between and among underwater divers and that enables divers to receive a signal from another diver or from a fixed location and to identify the direction and the distance to the source of the received signal using a Doppler frequency shift.

BACKGROUND OF THE INVENTION

In the field of scuba diving, it is well known that at times it is difficult for a diver to find his or her way back to a dive boat, to re-join a companion or buddy diver, or to identify and locate a designated underwater object. This is especially true when underwater visibility is poor.

Prior art underwater location devices are typically combined with a communication device. For example, U.S. Pat. No. 3,181,115 to Wainwright discloses a device that uses a directional hydrophone to locate a desired object (i.e., for homing).

U.S. Pat. No. 3,469,231 to Geiling et al. discloses an apparatus for determining a direction of a signal by using a directional hydrophone along with an omni-directional hydrophone to detect the existence of the signal itself. Distance may be determined by measuring the power of the received signal.

U.S. Pat. No. 3,587,038 to Massa discloses a device which uses a directional hydrophone to determine the direction of a signal, while distance is determined by measuring the power of the received signal.

U.S. Pat. No. 3,792,424 to akatsuji et al. discloses a device for detecting the position of a movable object underwater. The device disclosed in Nakatsuji et al. has at least three ultrasonic receivers for detecting a position of the object under-water and that operate in conjunction with an ultrasonic transmitter mounted on the movable object. Distance between the device and the movable object is estimated by measuring the round trip time of a signal transmitted by the device. However, a large distance between hydrophones (i.e., between the ultrasonic receivers of the device and the ultrasonic transmitter of the object) is required to obtain an accurate measure of distance. Moreover, the size of the device makes it impractical for carrying by a scuba diver.

U.S. Pat. No. 5,570,323 to Prichard et al. discloses a device for determining a direction toward and a distance to a dive boat. The direction is estimated by measuring the angle of a received signal by using an array of three omni-directional hydrophones. The distance is estimated by measuring the round trip time of a signal transmitted and received by the device.

U.S. Pat. No. 5,666,326 to Holzschuh discloses a homing device which uses a single hydrophone located in close proximity to a diver's torso. The acoustic discontinuity between the diver's torso and the device provide the required directional sensitivity. However, the accuracy of the obtained directional sensitivity is low. Moreover, in order to operate the device, the diver must be in a vertical position, which is not typical for underwater swimming.

U.S. Pat. No. 5,784,339 to Woodsum et al. discloses a method for identifying the location of a diver or submersible object with respect to another diver or submersible object or surface craft. This is done by using an array of directional hydrophones to measure the angles of reception of a signal. The distance is estimated by measuring the round trip time of an interrogation signal transmitted and received by the diver.

All of the above-described prior art devices and methods are based on directional hydrophones or an array of omni-directional or directional hydrophones. It is generally known in the art that the directionality of a directional hydrophone depends on its size. Better directionality requires larger hydrophones. Moreover, an omni-directional hydrophone is required to determine the existence of a received signal. The prior art devices and methods discussed above provide relatively low accuracy and require relatively large directional hydrophones, in addition to requiring an omni-directional hydrophone. Consequently, the prior art devices and methods are generally not suitable or convenient for carrying by a scuba diver. Finally, none of the devices and methods disclosed above provide the azimuth (an angle in degrees relative to a fixed point, such as magnetic North) toward the object to be located.

U.S. Pat. No. 5,463,598 to Holland discloses a method based on the Doppler effect for locating a diver or object in the water from a vessel. A receiver aboard the vessel acquires an acoustic signal transmitted by a hydrophone on the diver or object and compares the frequency of the received signal with an internal reference to determine the amount by which the received signal is Doppler shifted. This frequency shift is translated to velocity of the vessel which is displayed in knots on an illuminated red or green bar graph, with red indicating velocity away from and green indicating velocity toward the diver or object. If the vessel is piloted so as to maximize the green bar graph display, the vessel proceeds directly toward the diver or object. This type of apparatus makes it possible to find a diver or object in water only from a vessel. Moreover, the magnitude of the speed of the vessel must be kept constant during a search. Finally, the method disclosed by Holland does not provide the azimuth toward the object to be located.

Yet another object of the present invention is to provide an underwater communication method, device, and system capable of determining a direction from and a distance to an object using a single omni-directional hydrophone and further capable of bi-directional communication and display of textual messages.

Still another object of the present invention is to provide an underwater communication method, device, and system which can remotely cause an underwater device to transmit a locating signal to assist in locating an injured or otherwise disabled diver.

SUMMARY OF THE INVENTION

The present invention is directed to an underwater communication method, device, and system that enables bi-directional communication between and among underwater divers. The inventive underwater communication device may comprise a combination transmitter and receiver or, alternatively, separate transmitter and receiver devices may be provided. In the latter case, a diver may be equipped with a receiver and a transmitter may be located on a boat, a dock, a buoy, a diving instructor (either above or under-water), or other above-water or under-water structure, person, etc.

In accordance with the present invention, a device of the present invention is operable in a message mode in which textual messages may be transmitted and received between and among the divers in a network and/or between divers and a diving boat, buoy, or other reference location. Textual messages received by the inventive underwater communication device may be displayed on a display for viewing by the receiving diver. A device of the present invention is also operable in a homing mode in which one or more divers may receive a homing signal and move toward the source of that signal using an acquisition and tracking feature and functionality that utilizes a Doppler frequency shift and preferably a compass to determine the direction of the source of the signal. A device of the present invention may also be operable in an SOS mode which enables a diver in distress to broadcast a distress signal (i.e., SOS) that is received by every other diver within a predetermined distance from the distressed diver. The divers receiving the distress signal are then able to locate and rescue the distressed diver using the acquisition and tracking feature and functionality. The SOS feature may also be remotely operated by any driver on a network to locate a non-responding or lost diver. Homing and SOS signals are also collectively referred to herein as a locating signal.

When operated in the message mode, the device of the present invention may transmit and receive predetermined textual messages to and from other devices within a network or between proximately located networks. For a particular network, each device operable in that network is preferably preprogrammed with the same predetermined textual messages, with a unique device address, with the unique addresses of every other device operable in that network, with a network identification code, and with a plurality of predetermined transmit and receive frequencies for message, homing, and SOS signals. When operated in message mode, a diver may select one of a plurality of predetermined and prerecorded textual messages for transmission to one or to a plurality of other divers in the transmitting diver's network. The textual messages may be generally categorized as "response required" and "no response required" messages. For example, a "response required" message may be "ARE YOU OK?" If a diver transmits a message of that type to another diver and fails to receive a response, there may be a problem with the intended receiving that requires the transmitting diver to take action. An example of a "no response required" message may be "STOP."

When operated in the homing or SOS mode, the receiver of the present invention, upon receipt of a homing or SOS signal, performs a location function and process which consists of an acquisition function and a tracking function. The acquisition function uses a Doppler frequency shift of the frequency of the received signal and a compass reading to determine the location of the source of the homing or SOS signal.

Once the source of the signal is located, the receiver performs a tracking function during which it continuously monitors the frequency shift of the received signal, and uses the compass to display an azimuth to the diver, to assist the diver in swimming towards the signal source.

With the present invention, the location function and process (employed by the homing and SOS mode operation) requires transmission of a signal having a predetermined frequency. The receiver of a remote diver may move in any random direction with a constant, but an unknown, magnitude of velocity, while measuring a frequency of the received signal and comparing it with the predetermined frequency. Such movement of the receiver introduces a frequency shift in the frequency of the received signal, when compared with the frequency of the transmitted signal. The amount of frequency shift, due to the Doppler effect, is determined by the receiver, which compares the frequency of the received signal at uniformly spaced time intervals (0.5 seconds, for example). At the same time, the azimuth of the direction of movement of the receiver is determined using a compass. The measured values for Doppler frequency shift and azimuth are used by the receiver to guide a diver to a fixed or generally fixed object (homing mode) or to a distressed diver (SOS mode).

In particular, during the acquisition function, the receiving diver attempts to move along a closed path (a circle for example). In such a case, by traversing a closed path, all possible azimuths, from 0° up to 360°, are considered during the diver's movement, including those for which the Doppler frequency shift is zero. If the derivative of the azimuth and the derivative of the frequency shift have the same sign, then 90° is added to the selected azimuth to obtain a first value of the azimuth of the direction toward the transmitter. If the derivative of the azimuth and the derivative of the frequency shift do not have the same sign, 270° is added to the selected azimuth to obtain a second value of the azimuth of the direction toward the transmitter. The first and second values of the azimuth are averaged to generate an estimated azimuth of the direction toward the transmitter.

In the tracking function, the diver swims toward the transmitter using the estimated azimuth found in the acquisition function. The diver preferably maintains a magnitude of velocity of his swimming that is as constant as possible. However, the specific value of the magnitude of velocity is not important and need not be known. The receiver (the processor of the receiver) evaluates the highest positive frequency shift and displays an updated azimuth toward the transmitter, if there is a change in direction based on the highest positive frequency shift. It is preferable to display only a deviation from the last azimuth found rather than the absolute azimuth relative to magnetic North. Consequently, the diver directs his course to ensure that the deviation from the highest frequency shift is as small as possible.

Distance is estimated by the receiver by measuring the intensity of the received signal. To make such a determination, the receiver must be programmed with the transmitting intensity of the signal.

The underwater communication device of the present invention includes a transmitter, a receiver, an acoustic transducer operable as an ultrasonic input and output device, a keypad, a display, preferably a liquid crystal display (LCD), an audible alert, and a compass. The transmitter and receiver may both be included in a single enclosure, or alternatively, they may provided in a separate enclosures, as a matter of routine design choice. It is preferable that the transmitter and receiver be provided in a single enclosure to enable a diver wearing, carrying, or otherwise using the inventive device to utilize the full functionality of that device (e.g., bi-directional communication of message signals, and transmission and reception of homing and SOS (or collectively, locating) signals). The underwater communication device of the present invention includes, within a single enclosure, the electronic hardware and software necessary to carry out the various functions of the inventive device. For example, a processor such as, for example, a digital signal processor (DSP) may be provided along with software to control that processor to carry out the acquisition and tracking functions, when the inventive device is receiving a homing signal or an SOS signal, and to carry out the message transmission functions and homing and/or SOS transmission functions. It will be obvious to persons skilled in the art from the disclosure provided herein that the various functions and functionality of the inventive device may be carried out by various different embodiments and combinations of electronic hardware and software such as, for example, a microprocessor, Application Specific Integrated Circuit (ASIC), or discrete components or combination of the aforementioned. Thus, the embodiments disclosed herein are provided as illustrative, non-limiting examples of a hardware and software configuration suitable for carrying out the various functions and functionality of the present invention.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference characters denote similar elements throughout the several views:

FIG. 8 depicts the format of an uncoded digital bit-stream in accordance with the present invention;

FIG. 9 is a table of uncoded binary and coded hexadecimal words in accordance with the present invention;

FIG. 10 is a table of preferred frequencies for a transmitter and receiver in a plurality of networks in accordance with the present invention;

FIG. 19 is a table of measured angular values for the acquisition process of the present invention; and FIG. 20 is a table depicting the effect of variation in diver velocity on the accuracy of the estimated azimuth.

DETAILED DESCRIPTION OF THE PRESENTLY PREFERRED EMBODIMENTS

The present invention is directed to an underwater communication method, device, and system that enables bi-directional communication between and among underwater divers. In accordance with the present invention, messages may be transmitted and received between and among the divers in a network and/or between divers and a diving boat, buoy, or other reference point. The present invention also permits one or more divers to receive a homing signal and to move toward the source of that signal using an acquisition and tracking feature and functionality that utilizes a Doppler frequency shift and preferably a compass to determine the direction of the source of the signal and the distance by measuring the power of a received signal. The present invention also enables a diver in distress to broadcast a distress signal (i.e., SOS) that is received by every other diver within a predetermined distance from the distressed diver. The divers receiving the distress signal are then able to locate and rescue the distressed diver using the acquisition and tracking feature and functionality. The present invention also provides an underwater communication device that may transmit a remote SOS activation code to remotely cause another communication device constructed in accordance with the present invention to transmit a locating signal (i.e., an SOS signal).

Figure 1:
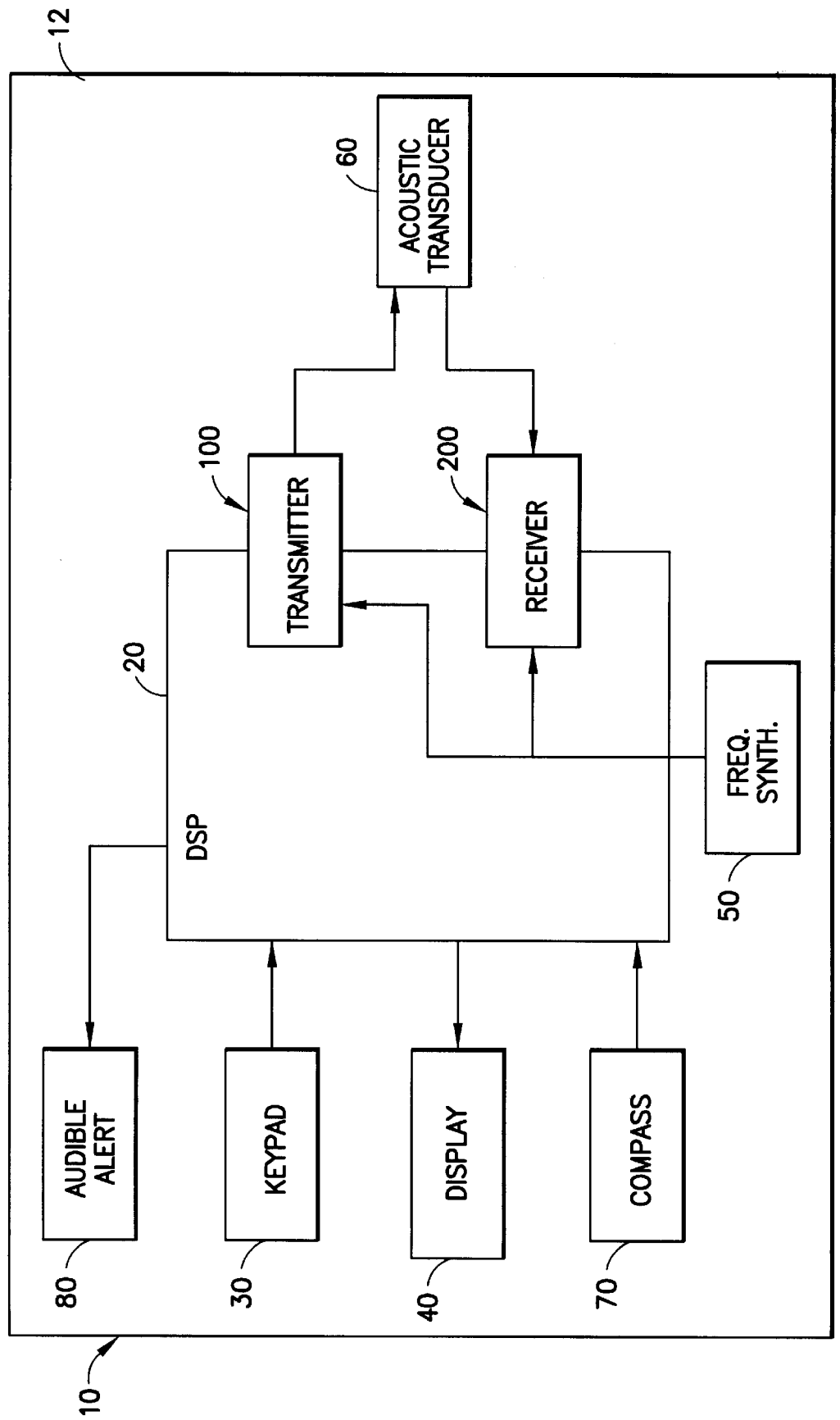
FIG. 1 is a block diagram of an under-water communication device constructed in accordance with the present invention.
Figure 11:
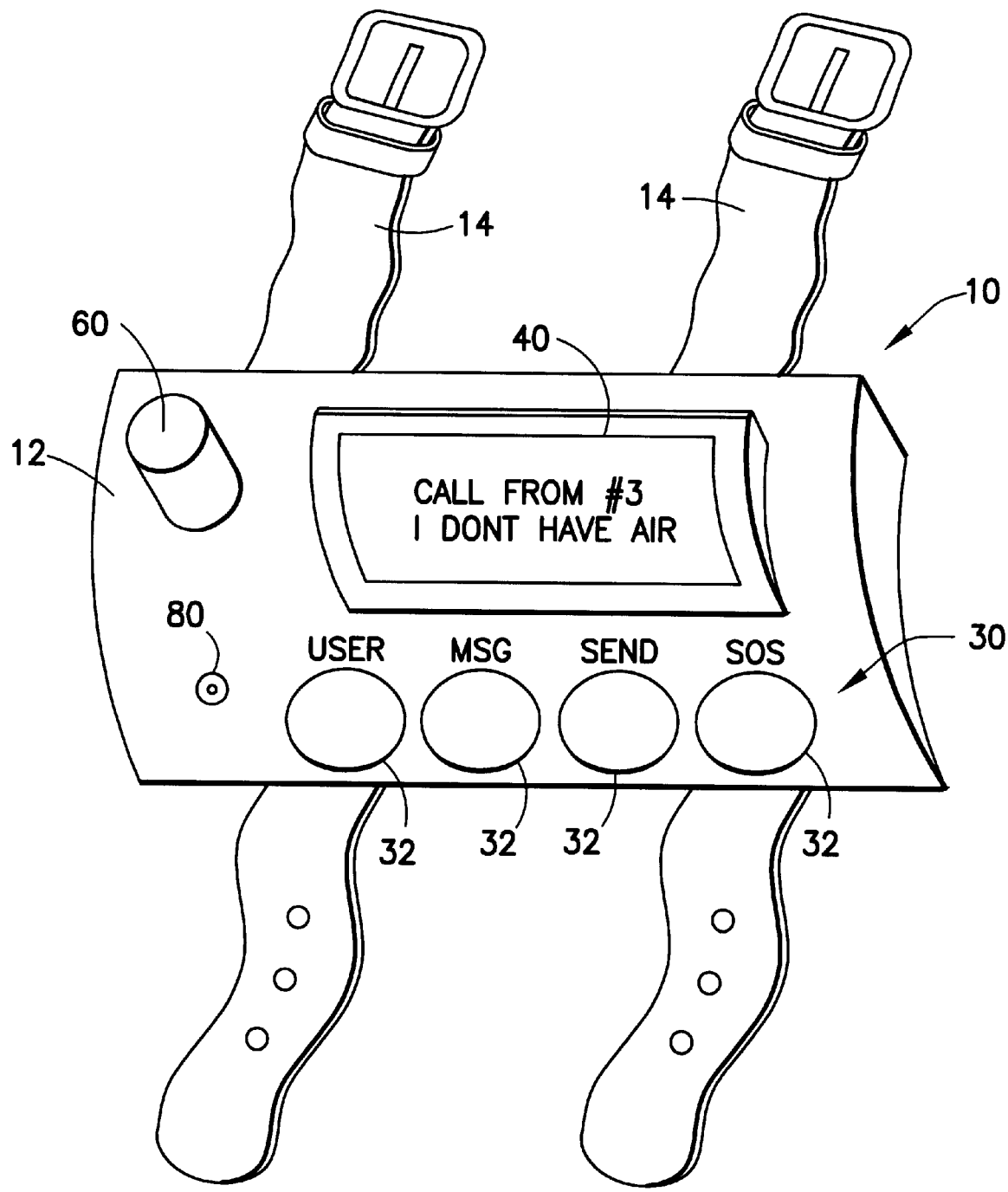
FIG. 11 depicts a wearable communication device constructed in accordance with the present invention.

Referring next to FIGS. 1 and 11, a preferred embodiment of the present invention is directed to an underwater communication device 10 in an enclosure 12 securable to a diver using straps 14. The device 10 also includes a transmitter 100, a receiver 200, an omni-directional acoustic transducer 60 (such as, for example, a model DC 7998/31-by Air Mar Ltd.) as an ultrasonic input and output device, a keypad 30 having a plurality of keys 32 as an input device, a display 40, preferably a liquid crystal display (LCD) as an output device, an audible alert 80 such as, for example, a buzzer, as an output device, and a compass 70 as an input device. A frequency synthesizer 50 generates the required transmit and receive carrier frequencies, as well as the desired SOS signal frequency. Preferably, part of the transmitter 100 and receiver 200 functionality is carried out by a digital signal processor (DSP) 20, and part by discrete electronic circuits and devices, as described in more detail below.

The communication device 10 of the present invention is operable in a plurality of modes including, but not limited to, a message mode, a homing mode, and an SOS mode. The message mode provides for communication of one of a plurality of preprogrammed textual messages between devices 10 and between and among devices 10 in a network 150 (see, e.g., FIG. 12). As is readily appreciated, night diving can be quite disorienting and finding one's diving boat may be difficult without a homing signal. The homing mode thus permits a diver to receive a signal from a fixed object such as a boat, a tethered buoy, or instructor, and to locate that object. The SOS mode provides for communication of a distress or SOS signal from a diver in distress to all other divers (i.e., communication devices 10) in the distressed diver's network and to divers not in the distressed diver's network but located within a predetermined distance therefrom. The SOS mode can also be remotely activated by the transmission and reception of a remote SOS activation code.

The present invention is preferably configured as a wearable device that includes both the transmitter and receiver circuits and functionality. However, alternative embodiments may provide for separate transmitter and receiver devices, and may or may not be configured as a wearable device, as a routine matter of design choice. For example, a transmitter in accordance with the present invention may be located on a ship, buoy, or other above-water apparatus (as depicted in FIG. 12), while the receiver device may be worn by a diver below the surface of the water.

Figure 12:
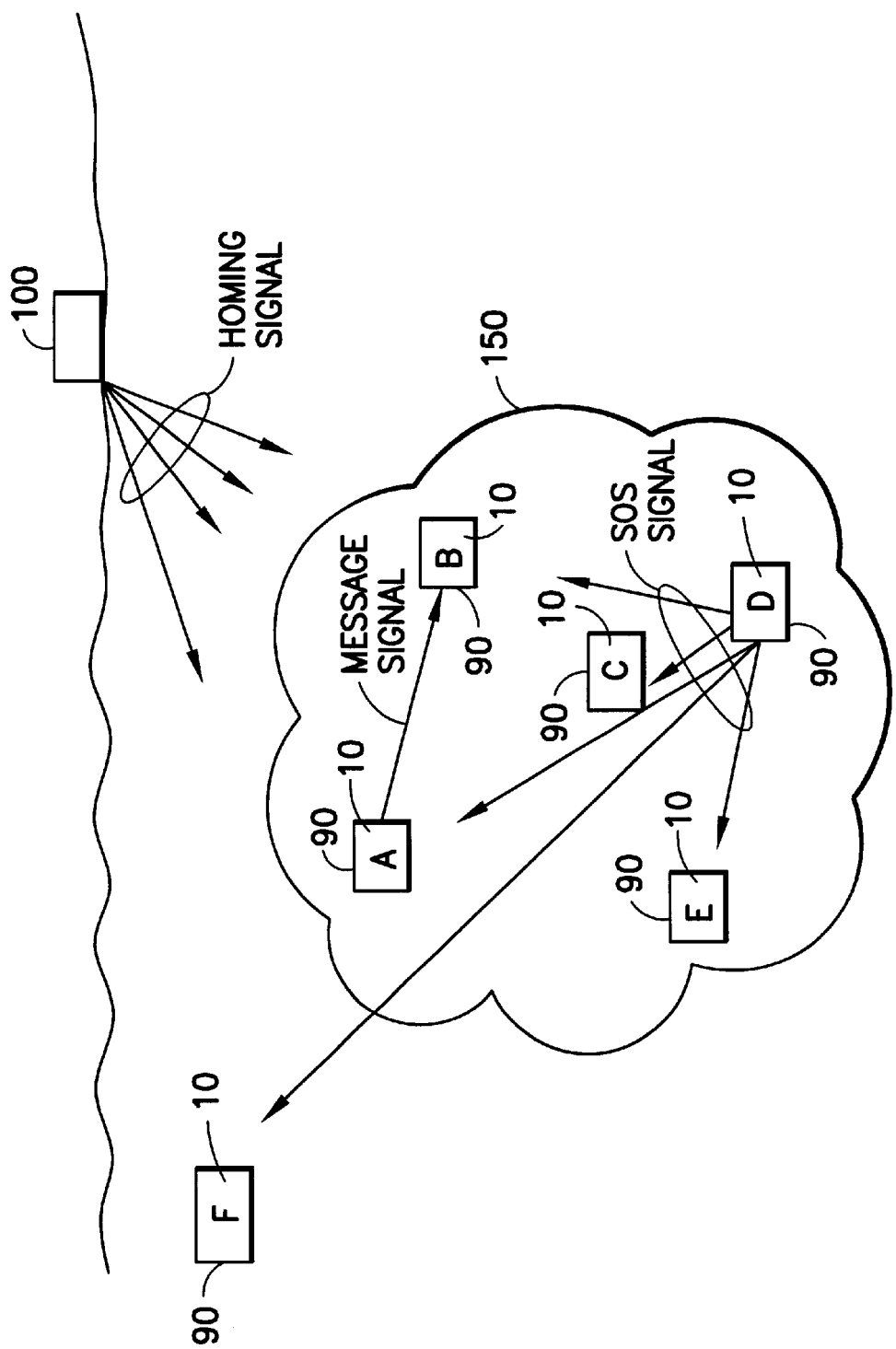
FIG. 12 depicts a plurality of under-water divers, each having a communication device in accordance with the present invention and collectively forming an under-water communication network.

A communication device 10 constructed in accordance with the present invention may be worn by each of a plurality of divers 90 to form an under-water communication network 150, as depicted in FIG. 12. In such a network 150, device 10 worn by each of the plurality of divers 90 may be preprogrammed to transmit and receive homing and SOS signals having the same predetermined frequencies (see, e.g. FIG. 10). Each device 10 may also preprogrammed to transmit and receive the same predetermined textual messages using the same predetermined transmit and receive frequencies (as depicted in FIG. 10). For example, diver A in network 150 may communicate a message selected from a plurality of prerecorded messages to diver B in that same network 150. Each diver's communication device 10 will include device identification codes for all other divers 90 in the same network 150 so that communication between and among the divers 90 in that network 150 is possible. In addition, diver A may be able to communicate a message signal to diver F if diver A's device 10 is programmed with diver F's identification code and network identification code. It is also conceivable that a plurality of networks may co-exist in the same diving area. In such a situation, the communication devices 10 in each of the networks must be capable of operating independent of and without interference from the devices 10 in other, proximately located networks. Message signals communicated in one network must not affect message signals communicated in another proximately located network. Similarly, homing signals in proximately located networks must not interfere with each other. However, it is preferable that an SOS signal will always be transmitted and received at the same frequency (see, e.g., FIG. 10), regardless of the network from which the SOS signal is transmitted or received, and regardless of the number of networks co-existing in the same under-water diving area. Thus, for a plurality of co-existing networks, an SOS signal transmitted by a diver in distress in one network will be received by divers in that network and in other networks that are located within a predetermined distance from the diver in distress, preferably within approximately 800 meters.

A plurality of devices 90, (see FIG. 12) each equipped with the inventive device 10 (comprised of either a combined transmitter 100 and receiver 200 or alternatively, of only a receiver 200), may collectively form an underwater communication system or network 150, which may also include a remotely located transmitter 100. Each of the devices 10 comprising the underwater communication system or network 150 may be programmed with the same textual messages, with a unique device identification code or address and with the unique identification codes or addresses of all other devices in the network 150, to receive a homing signal at a predetermined frequency, and to transmit an SOS signal at a predetermined frequency. While the SOS signal frequency is preferably the same for any device in any system or network 150 (see, e.g., FIG. 10), different homing signal frequencies are provided for different networks 150.

Figure 2:
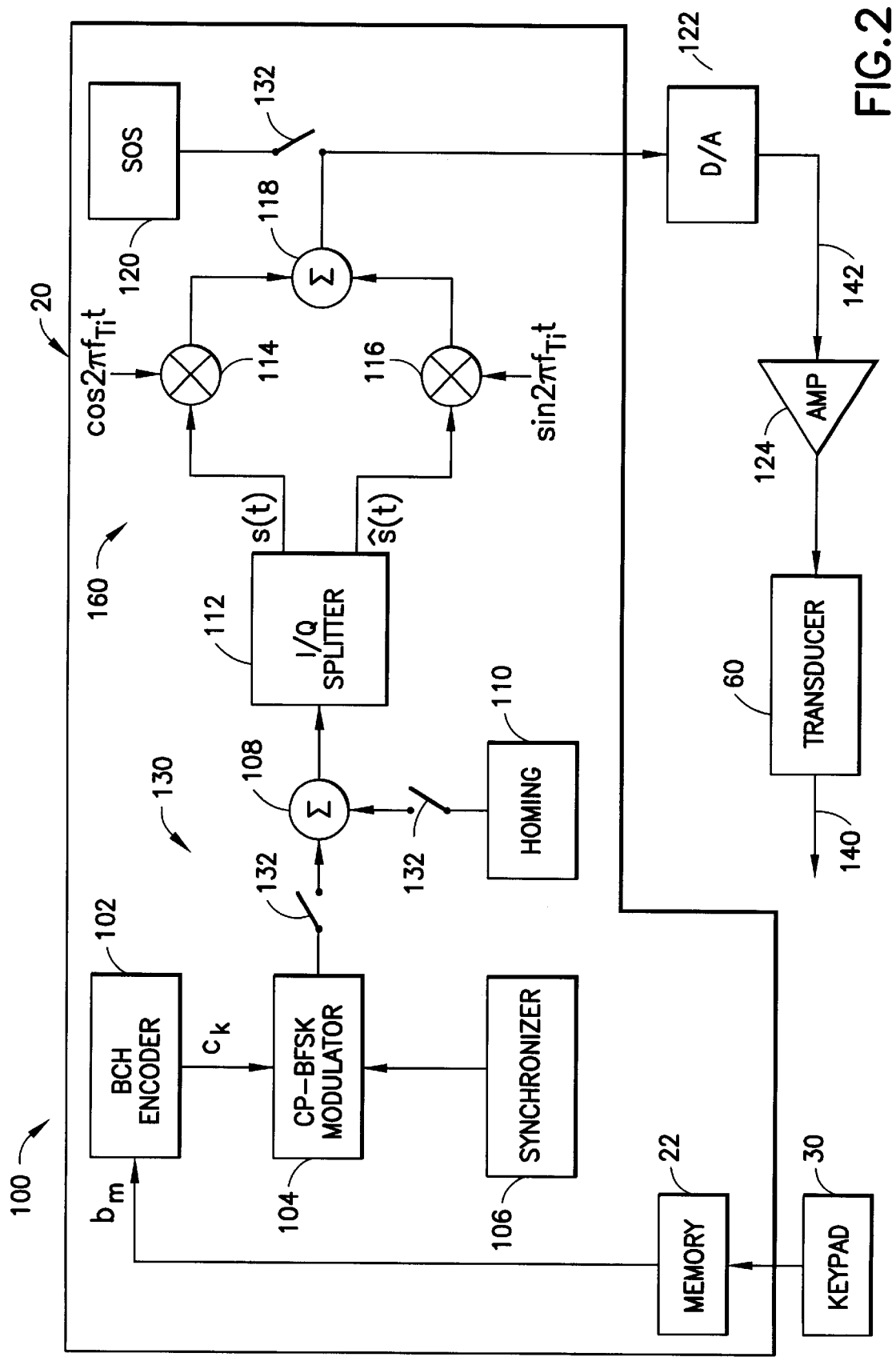
FIG. 2 is a schematic diagram of the transmitter of FIG. 1.

Referring specifically to a preferred embodiment of a transmitter 100 in accordance with the present invention, and with reference to FIG. 2, the transmitter 100 functions generally as a sine wave generator that produces an output signal 142, which may, by way of non-limiting example, be in the form of $\cos 2\pi f_0 t$ where $f_0$ is the transmit carrier frequency and is approximately equal to 42.2 kHz for a first network (see, e.g., FIG. 10), for example. This signal 142 is amplified by a power amplifier 124 and converted by an omni-directional transducer 60, into an ultrasonic acoustical signal 140 that propagates through the water.

With continued reference to FIG. 2, a preferred transmitter 100 in accordance with the present invention will now be described in detail. As is apparent from FIGS. 1 and 2, the transmitter 100 (and receiver 200, as discussed below) is comprised of discrete hardware devices (e.g., D/A converter 122, amplifier 124, transducer 60), and of a digital signal processor (DSP) 20 comprised of a combination of hardware and software. Thus, the following detailed description of a preferred transmitter 100 and receiver 200 is merely illustrative of the functionality of those components, and various specific hardware and software configurations and embodiments may be configured and constructed in accordance with the teachings provided herein.

The inventive under-water communication device 10 may be configured to communicate one of a plurality of predetermined textual messages from a message signal generator 130, a homing signal from a homing signal generator 110, or an SOS signal from an SOS signal generator 120. Only one of those signals may be communicated by the transmitter 100 at a time, selection of which signal to transmit being selected by a diver and facilitated by the diver's selection of a key 32 provided on the keypad 30.

When operating in message mode, and with continued reference to FIG. 2, a diver selects, via a keypad 30, one of the plurality of textual messages stored in memory 22. By repeatedly depressing a "MSG" key 32 (see, e.g., FIG. 11), the each of the stored textured messages is displayed on the display 40. The textual messages may be programmed in memory 22 using, for example, a personal computer and an RS-232 interface for example (not shown) on the device 10. Each stored textual message is assigned a unique message identification number that is accessed when a user selects a message using the keypad 30. The stored textual messages may be generally categorized as "response required" and "no response required" messages. For example, a "response required" message may be "ARE YOU OK?" If a diver transmits a message of that type to another diver and fails to receive a response from that other diver, there may be a problem with the intended recipient that requires the transmitting diver to take action. An example of a "no response required" message may be "STOP." Once a textual message has been selected for transmission by a diver, and that diver has also selected an intended receiving diver (or divers) using the "USER" key 32, for example, the DSP 20 processes the information stored in memory 22 for communication to the selected diver(s) as described below. Transmission is achieved by diver A depressing the "SEND" key 32.

A digital bit-stream, depicted as $b_m$ in FIG. 2 (where m represents a bit number between 1 and 12), is output from memory 22 and includes three vectors formatted as depicted in FIG. 8. The bit-stream bm includes four message bits, M, that identify a storage location in memory 22 at which the textual message is located (for the receiving device to locate the textual message in memory 22), four sender-ID bits, S, that provide a unique identifier for the sending diver (i.e., transmitter 100), and four addressee-ID bits, A, that provide a unique identifier for the receiving diver (i.e., receiver 200). Only a diver 90 having an address that matches the addressee-ID bits can decode a received message signal, although that message signal may be received by other divers 90 in the same network 150. Each of the three vectors that make up the bit-stream $b_m$ is independently encoded by an encoder 102 using Bose-Chaudhuri-Hocquenghem (BCH) code to produce a code word from the table of FIG. 9 based on the value of the bits in the vector and also based on the format (n, k, $d_H$), where k represents the original number of message data bits, n represents the coded number of message data bits, and $d_H$ represents the Hamming distance (i.e., error detection). The encoder 102 outputs an encoded message bit-stream $c_k$ comprised of a plurality of hexadecimal code words, one for each of the four-bit vectors of the digital bit-stream $b_m$. The total encoded message bits is 3n, i.e., 21 for (7, 9, 3) code or 45 bits (15, 9, 6) code.

Each coded n-bit vector of the digital bit-stream $c_k$, may be represented as follows:

$$A_c=[A_c(1), A_c(2), \ldots A_c(n)] \quad (1)$$

$$S_c=[S_c(1), S_c(2), \ldots S_c(n)] \quad (2)$$

$$M_c=[M_c(1), M_c(2), \ldots M_c(n)] \quad (3)$$

The output of the encoder 102 is scrambled according to:

$$B=[A_c(1), S_c(1), M_c(1), A_c(2), S_c(2), M_c(2), \ldots A_c(n), S_c(n), M_c(n)] \quad (4)$$

A synchronization vector of N bits is generated by a synchronizer 106 and added to the encoded message bit-stream B to produce a total encoded message bit-stream of N+3n bits. The format of the synchronization vector is 0010111 for N=7, and 110101111000100 for N=15.

The total encoded message bit-stream (i.e., total encoded message bits and synchronization vector) is converted to a frequency modulated digital bit-stream by a continuous-phase binary-frequency-shift-keying (CP-BFSK) modulator 104. Three parameters define the modulation provided by the CP-BFSK modulator 104: bit-duration, T, center frequency, $f_c$, and frequency deviation, $\Delta f$. The value of T must be greater than a multipath spread delay, $T_d$. In a preferred embodiment, $T_d$ is not greater than 30 ms and T is approximately equal to 50 ms.

The frequency assigned to a digital zero by the CP-BFSK modulator 104 is defined as $f^{(0)}=f_{ci}-\Delta f$, where i represents a particular network (see, e.g., FIG. 10). The frequency assigned to a digital one is defined as $f^{(1)}=f_{ci}+\Delta f$. In a preferred embodiment, a digital zero of a message signal is represented by a frequency of 240 Hz and a digital one is represented by a frequency of 480 Hz. The value of $\Delta f$ must be greater that the maximal possible Doppler shift frequency, denoted herein as D$f$. In a preferred embodiment, D$f$ is less than or equal to approximately 100 Hz and $\Delta f$ is approximately equal to 120 Hz. Preferred frequencies for $f^{(0)}$ and $f^{(1)}$ are provided in FIG. 10 for five different, co-existing networks. For example, for a first network having $f_{c1}$ of approximately 42.65 khz, $f^{(0)}$ is approximately equal to 42.44 kHz and $f^{(1)}$ is approximately equal to 42.68 kHz.

The CP-BFSK modulator 104 may be implemented using an inverse fast Fourier transform procedure with $$T = \frac{N}{f_s},$$

where $f_s$ is the sampling frequency and is approximately equal to 10.24 kHz and 20.48 kHz for a value for N approximately equal to 512 and 1024, respectively.

The frequency modulated digital bit-stream output by the CP-BFSK modulator 104 is input to an adder 108 and is then up-converted to a single-sideband signal by an up-converter 160 comprised of an I/Q splitter 112, mixers 114, 116 and an adder 118. The I/Q splitter 112 splits the frequency modulated output of the CP-BFSK modulator 104 into an in-phase signal s(t) and a quadrature signal ŝ(t). The output s(t) of I/Q splitter 112 is in-phase with the input signal and the output ŝ(t) is phase-shifted by approximately 90° from the input signal. The in-phase and quadrature signals s(t), ŝ(t) are input to separate mixers 114, 116 and upper single-side band modulated by a high-frequency carrier signal in the form cos $2\pi f_{Ti}t$, for s(t), and sin $2\pi f_{Ti}t$, for ŝ(t), where i represents the network within which the communication device 10 is operated and $f_T$ the transmit carrier frequency of that network (see, e.g., FIG. 10). The two high-frequency signals (i.e., up-converted s(t), ŝ(t)) are combined by adder 118 and output from the DSP 20 to a digital-to-analog (D/A) converter 122. The D/A converter 122 provides an output signal 142 in the form of cos $2\pi f_{Ti}t$ where $f_{Ti}$ is the transmit carrier frequency. This signal 142 is amplified by a power amplifier 124 that has a bandwidth preferably between approximately 35 kHz and 55 kHz, an output power of approximately 3 W, and nonlinear distortion of approximately 1%. The output signal 142 is converted by an omni-directional transducer 60 into an ultrasonic acoustical signal 140 that propagates through the water.

When operated in the homing mode, a homing signal generator 110 generates a pure sine wave having a frequency of approximately 960 Hz that is processed (i.e., up-converted, D/A converted, etc.) by the transmitter 100 as described above. The up-converted frequency of the homing signal is unique for each network, with illustrative, non-limiting frequencies indicated as $f_{Hi}$ in FIG. 10, where i represents a particular network.

When operated in the SOS mode, an SOS signal is generated by an SOS signal generator 120 as a high frequency pure sine wave having a predetermined frequency as indicated in FIG. 10. The frequency of an SOS signal is the same for every device 10, regardless of the under-water network within which a particular device is used. Thus, any diver in distress can transmit an SOS signal that can be received by any other diver within approximately 800 meters of the distressed diver.

The general functionality of the device 10 for homing and SOS modes is substantially the same, i.e., both modes may be used to assist a diver 90 in locating and swimming toward a transmitter 100. Thus, both homing and SOS modes, and thus, both homing and SOS signals, are also referred to herein as a locating mode and locating signal, respectively.

Figure 3:
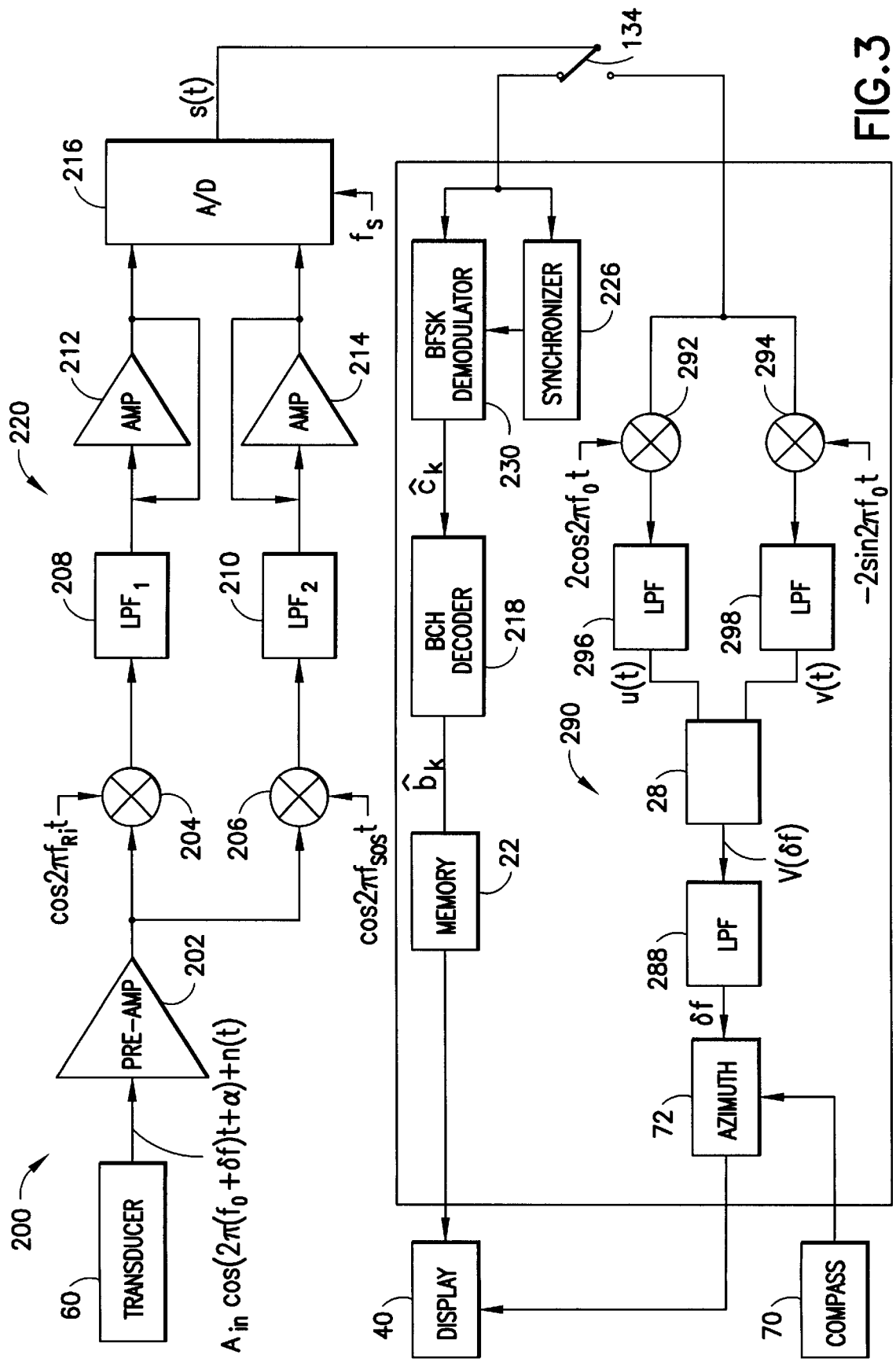
FIG. 3 is a schematic diagram of the receiver of FIG. 1.
Figure 4:
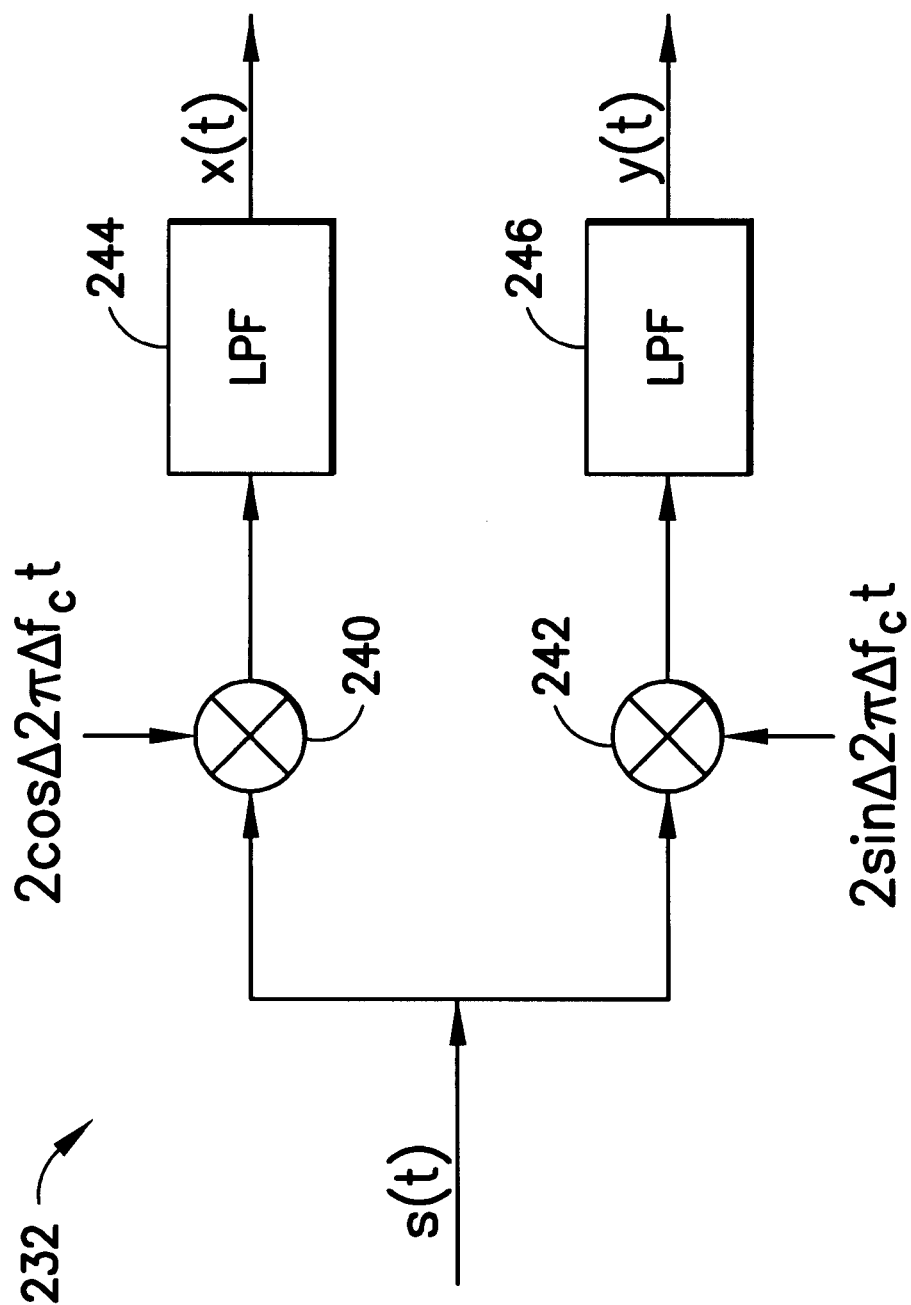
FIG. 4 is a schematic diagram of a first stage of a binary frequency-shift-keying (BFSK) demodulator of the receiver of the present invention.

Referring next to FIG. 3, a receiver 200 constructed in accordance with a preferred embodiment of the present invention is there depicted. As indicated above and with respect to the transmitter 100, the receiver 200 is comprised of discrete hardware devices (e.g., transducer 60, pre-amp 202, down-converter 220, A/D converter 216), and of an appropriately configured DSP 20 comprised of a combination of hardware and software.

With continued reference to FIG. 3, a transmitted ultrasonic acoustical signal may be received by the transducer 60 and amplified by the preamplifier 202. Preferably, the preamplifier 202 has a bandwidth of between approximately 35 kHz and 55 kHz. The received acoustical signal preferably has an amplitude of at least approximately 50 $\mu$V to be detectable by the preamplifier 202. That minimum input voltage corresponds to the voltage obtained at the output of a 60 dB (at 50 kHz) insertion loss receiving transducer when the transmitting transducer is driven by a 100 V signal and located approximately 1000 meters from the receiving transducer. The received acoustical signal also must have a maximum amplitude of no greater than approximately 100 mV, which corresponds to the voltage obtained at the output of a 60 dB (at 50 kHz) insertion loss receiving transducer when the transmitting transducer is driven by a 100 V signal and located approximately 1 meter from the receiving transducer. The output of the preamplifier 202 is input to a down-converter 220 comprised of mixer 204, low-pass filter 208 and amplifier 212, for a message signal or a homing signal, and mixer 206, low-pass filter 210, and amplifier 214 for an SOS signal.

A received message signal is mixed by mixer 204 with a signal in the form cos $2\pi f_{Ri}t$, where $f_{Ri}$ represents a receive carrier frequency and is approximately equal to the transmit carrier frequency, $f_{Ti}$, (see, e.g., FIG. 10). The specific carrier frequency input to mixer 204 is network specific and prevents signals from other, proximately located underwater networks from interfering with the operation of a communication device 10 in the presence of other devices in other networks. The demodulated signal is input to low-pass filter 208 having a cut-off frequency (i.e., a –3 dB frequency) approximately equal to 1020 Hz, and a stop frequency (i.e., a –40 dB frequency) approximately equal to 1380 Hz. The low-pass filter 208 passes a frequency of approximately 240 Hz for a digital zero, a frequency of approximately 480 Hz for a digital one, and a frequency of approximately 960 Hz for a homing signal.

The down-converted and filtered signal is amplified by amplifier 212, and converted to a digital signal s(t) by A/D converter 216; signal s(t) is approximately the same as the in-phase signal processed by the transmitter 100 (as described in detail above and with reference to FIG. 2). For a message signal, digital signal s(t) is comprised of a frequency-shifted digital signal with a digital zero represented by a 240 Hz part and a digital one represented by a 480 Hz part.

When a message signal is received, switch 134 causes signal s(t) to be simultaneously input to a synchronizer 226 that detects the synchronization vector, and to a binary frequency-shift-keying (BFSK) demodulator 230 that converts the signal s(t) to a BCH coded signal $\hat{c}_k$, which is then converted to a digital bit-stream $\hat{b}_k$. Signal $\hat{c}_k$ is decoded by comparing it with the coded values in FIG. 9, which are stored in memory 22. More specifically, a code word from FIG. 9 having a minimal Hamming distance to signal $\hat{c}_k$ is selected as the received code word. The digital bit-stream $\hat{b}$ identifies a unique message identification code which points to an address in memory 22 at which the transmitted textual message is stored. The data stored at the specific memory address location may be displayed via the display 40 under control by the DSP 20.

The BFSK demodulator 230 is comprised of a plurality of serially arranged stages, depicted in FIGS. 4–7. A first stage 232, depicted in FIG. 4 produces signals x(t) and y(t) from input signal s(t) by splitting, mixing and filtering that signal. For transmission of a digital one, signals x(t) and y(t) are of the form cos $(2\pi\Delta ft+\phi_1)$ and $-\sin(2\pi\Delta ft+\phi_1)$, respectively. For transmission of a digital zero, signals x(t) and y(t) are of the form cos $(2\pi\Delta ft-\phi_0)$ and $+\sin(2\pi\Delta ft)-\phi_0)$, respectively. Signal s(t) is input into mixers 240 and 242, which receive a carrier frequency input in the form of 2 cos $2\pi\Delta ft$ and 2 sin $2\pi\Delta ft$, respectively. The frequency component $\Delta f$ of the input to the mixers 240, 242 is preferably approximately equal to 360 Hz (i.e., the average of the difference between the frequency representing a digital one and a digital zero). The output of mixers 240, 242 is low-pass filtered by filters 244, 246, each of which has a cut-off frequency of approximately 270 Hz and a stop frequency of approximately 420 Hz.

Figure 5:
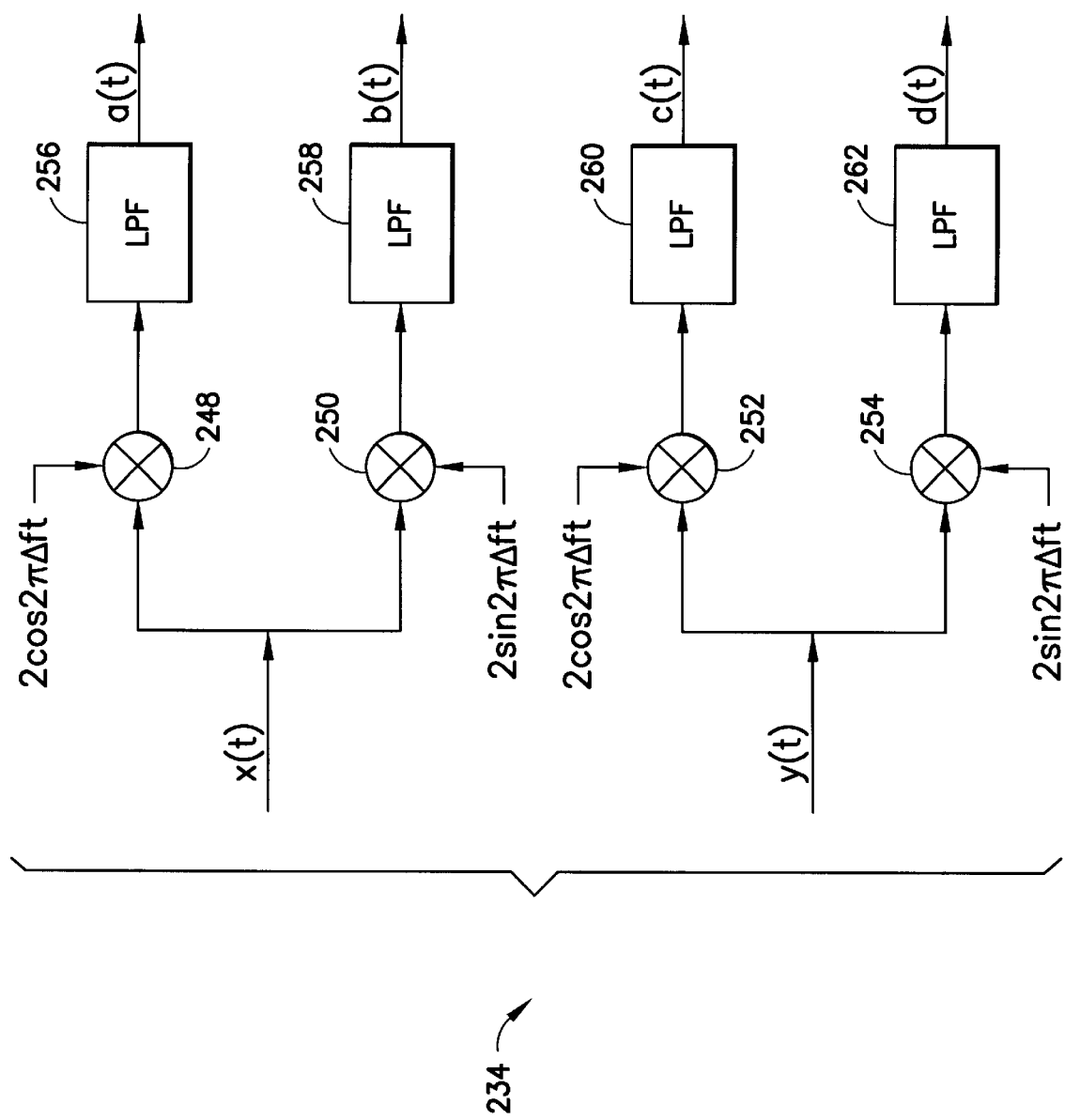
FIG. 5 is a schematic diagram of a second stage of the BFSK demodulator of the receiver of the present invention.

Signals x(t) and y(t) are output from the first stage 232 and input to a second stage 234, depicted in FIG. 5, which produces signals a(t), b(t), c(t), and d(t). Signal x(t) is input to mixers 248 and 250, and signal y(t) is input to mixers 252 and 254, each of which receive an input of the form of 2 cos $2\pi\Delta ft$ or 2 sin $2\pi\Delta ft$, as indicated in FIG. 5, and where $\Delta f$ is approximately equal to 120 Hz (i.e., the half difference between a digital one and a digital zero). Low-pass filters 256, 258, 260, 262 are provided at the outputs of the respective mixers 248, 250, 252, 254, each having a cut-off frequency approximately equal to 100 Hz and a stop frequency approximately equal to 140 Hz. For transmission of a digital one, signals a(t), b(t), c(t), and d(t) are of the form cos $\phi_1$, $-\sin \phi_1$, $-\sin \phi_1$, and $-\cos \phi_1$, respectively. For transmission of a digital zero, signals a(t), b(t), c(t), and d(t) are of the form cos $\phi_1$, sin $\phi_1$, $-\sin \phi_1$, and cos $\phi_1$, respectively.

Figure 6:
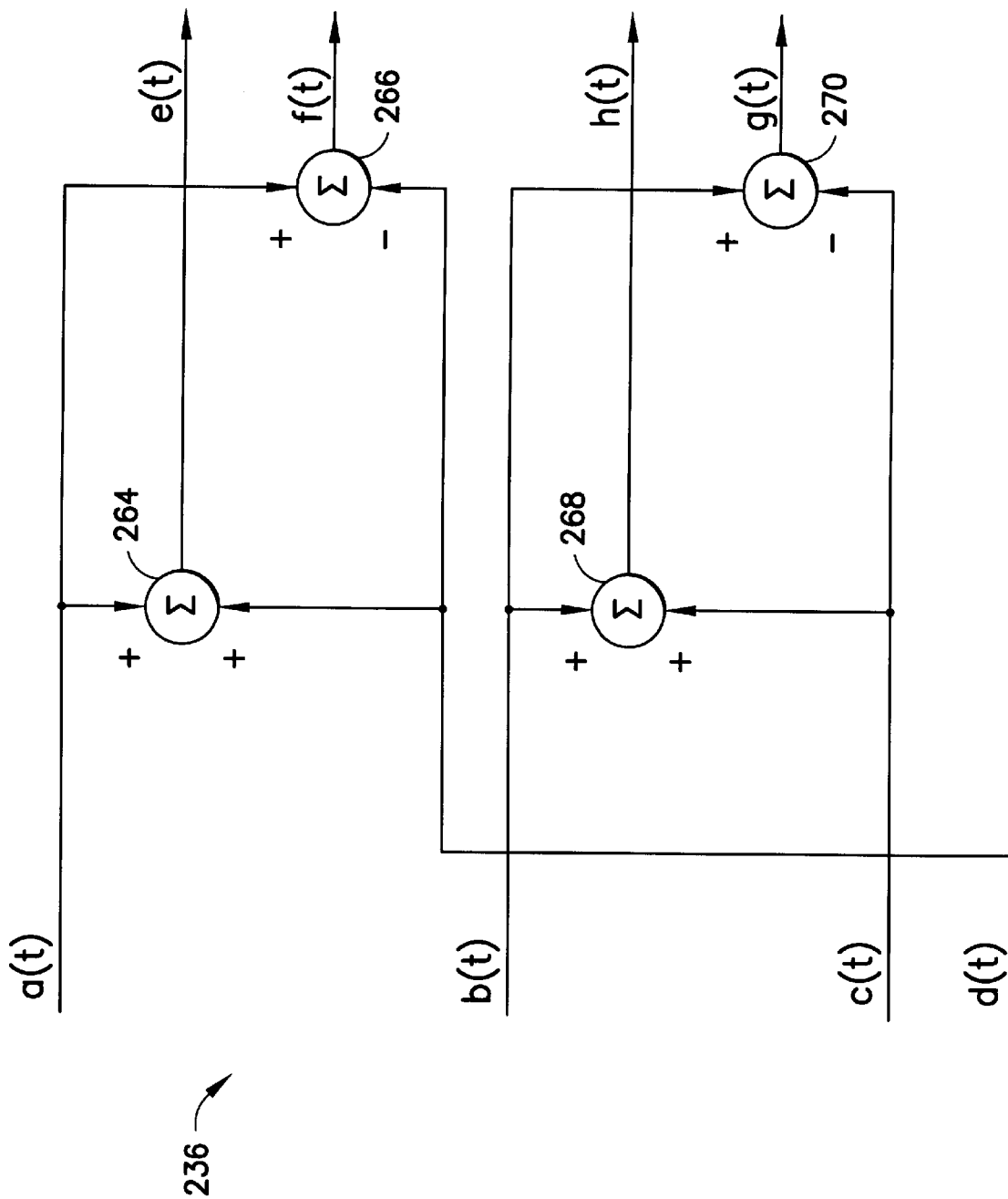
FIG. 6 is a schematic diagram of a third stage of the BFSK demodulator of the receiver of the present invention.

Signals a(t), b(t), c(t), and d(t) are output from the second stage 234 and input to a third stage 236, depicted in FIG. 6, which produces output signals e(t), f(t), g(t), and h(t). Signals a(t) and d(t) are combined by adders 264, 266 to produce output signals e(t) and f(t), respectively. Signals a(t) and d(t) are input to adder 264 with the same polarity (as indicated by the "+" signs), while those signals are input to adder 266 having opposite polarity (as indicated by the "+/−" signs). Signals b(t) and c(t) are combined by adders 268, 270 to produce output signal h(t) and g(t), respectively. Signals b(t) and c(t) are input to adder 268 with the same polarity (as indicated by the "+" signs), while those signals are input to adder 270 having opposite polarity (as indicated by the "+/−" signs). For transmission of a digital one, signal e(t) is approximately equal to 0, signal f(t) is of the form 2 cos $\phi_1$, signal g(t) is of the form 2 sin $\phi_1$, and signal h(t) is approximately equal to 0. For transmission of a digital zero, signal e(t) is of the form 2 cos $\phi_0$, signals f(t) and g(t) are approximately equal to 0, and signal h(t) is of the form 2 sin $\phi_0$.

Figure 7:
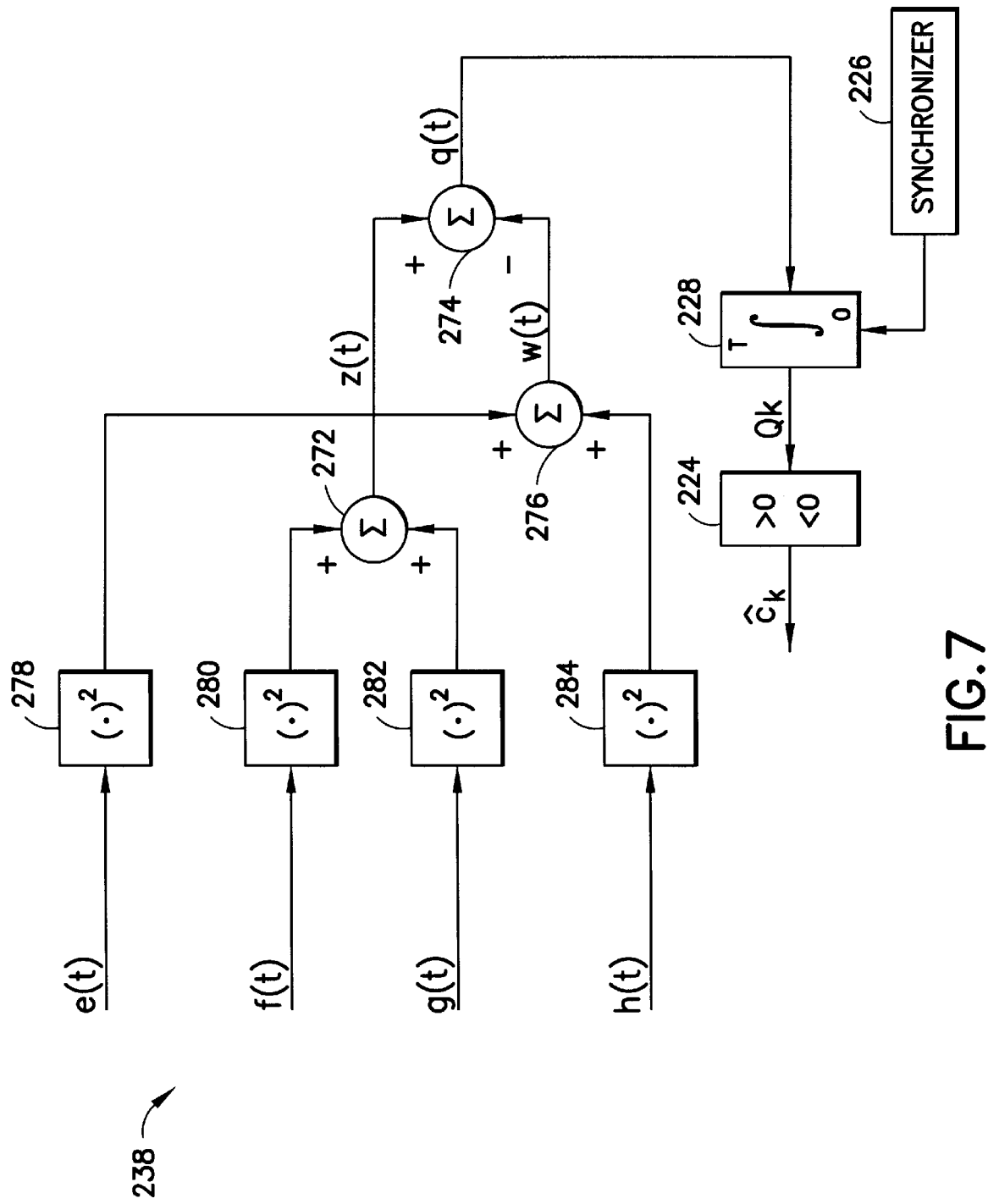
FIG. 7 is a schematic diagram of a fourth stage of the BFSK demodulator of the receiver of the present invention.

Signals e(t), f(t), g(t), and h(t) are output from the third stage 236 and input to a fourth stage 238, depicted in FIG. 7. Each of those signals is multiplied by itself by a respective multiplier 278, 280, 282, 284 so that the output of each of those multipliers is amplitude dependent, not frequency dependent. This is important because a textual message signal may experience a frequency shift during transmission in the water due to the Doppler effect. However, a receiver 200 constructed in accordance with the present invention and as disclosed herein may receive a Doppler-shifted textual message signal without effect to that signal. The outputs of the multipliers 278, 280, 282, 284 are combined by adders 272, 276 to produce signals z(t) and w(t), which are then combined by adder 274 to produce signal q(t). For transmission of a digital one, signals z(t), w(t), and q(t) are approximately equal to 4, 0, and 4, respectively. For transmission of a digital zero, signals z(t), w(t), and q(t) are approximately equal to 0, 4 and −4, respectively.

Signal q(t) is then supplied to a matched filter 228 that integrates that signal over the period from t=0 to t=T, to produce signal $Q_k$, which is then input to a comparator 224 that determines whether a digital one or a digital zero has been received by the receiver 200. Signal $\hat{c}_k$, is output from the comparator 224 as a digital one if the value of $Q_k$ is greater than 0, and a digital zero if the value of $Q_k$ is less than 0. Signal $\hat{c}_k$, is then input to the BCH decoder 218 and converted to a digital bit-stream $\hat{b}$, which identifies the addressee, sender ID and an address in memory 22 at which the transmitted textual message is stored, and causes the textual message to be displayed on the display 40.

With continued reference to FIG. 3, when operating in homing mode, the device 10 receives a signal of the form $A_{in}$ cos $(2\pi(f_o+\delta f)t+\phi)+n(t)$, where $A_{in}$ is the amplitude of the received signal, $f_o$ is approximately equal to 43.160 kHz (i.e., $f_{H1}$) for a first network, as indicated in FIG. 10, and where $\delta f$ and $\phi$, respectively are the amount of Doppler frequency shift and a random phase angle, and where n(t) represents noise in the received signal. The received homing signal is demodulated by mixer 204 with a signal in the form cos $2\pi f_{Ri}t$, where $f_{Ri}$ represents a receive carrier frequency and is approximately equal to the transmit carrier frequency, $f_{Ti}$, (see, e.g., FIG. 10). The specific carrier frequency input to mixer 204 depends on the network for which a device 10 is configured (illustrative frequencies are provided in FIG. 10) and prevents signals from other, proximately located under-water networks, from interfering with the operation of the communication device 10 in the presence of other devices in other networks. The demodulated signal is input to low-pass filter 208 having a cut-off frequency approximately equal to 1020 Hz, and a stop frequency approximately equal to 1380 Hz.

The down-converted and filtered signal is amplified by amplifier 212, and converted to a digital signal s(t) by A/D converter 216; signal s(t) is approximately the same as the in-phase signal processed by the transmitter 100 (as described in detail above and with reference to FIG. 2).

When a device is in homing signal receiving mode, switch 134 causes signal s(t) to be input to mixers 292, 294, and low-pass filters 296, 298, which are tuned to receive a homing signal by a diver's activation of reception of a homing signal (a diver must activate reception of either a homing or a message signal, while an SOS signal is automatically received and takes priority over any other signal (i.e., message or homing) being received).

For a homing signal, the present invention determines the amount of Doppler frequency shift between the transmitted signal and the received signal to facilitate the location of the transmitter, i.e. the source of the homing signal. The signal s(t) is input to mixers 292, 294, and mixed with a signal having the form 2 cos $2\pi f_o t$ for mixer 292, and a signal having the form −2 sin $2\pi f_o t$ for mixer 294, where $f_o$ is approximately equal to the transmit carrier frequency. The output of the mixers 292, 294 is input to low-pass filters 296, 298, respectively, each having a cut-off frequency approximately equal to 100 Hz and a stop frequency approximately equal to 230 Hz. Output from the low-pass filters 296, 298, respectively, are signals u(t), having a form $A_c$ cos $(2\pi\delta f+\phi)$, and v(t), having a form $A_c$ sin $(2\pi\delta f+\phi)$, which are input to a Doppler frequency shift estimator 28 that estimates the Doppler frequency shift, $$V(\delta f)\ V(rf) = \frac{V(t)u(t-\Delta t) - u(t)y(t-\Delta)}{v^2(t)+u^2(t)} = \sin(2\pi\delta f \Lambda\phi).$$

The estimated Doppler frequency shift is supplied together with the current azimuth measured by the compass 70 to the azimuth estimation algorithm 72, which estimates the best azimuth which is displayed on the display 40.

The maximum negative Doppler frequency shift, −D$f$, is less than or equal to the estimated Doppler frequency shift, $\delta f$, which is less than or equal to the maximum positive Doppler frequency shift, D$f$, i.e., −D$f \leq \delta f \leq$ D$f$. A maximum Doppler frequency shift approximately equal to or less than 100 Hz is desired in accordance with the present invention.

The output of the Doppler frequency shift estimator 28 connects to a low-pass filter 288 that removes noise from the signal and outputs an estimation of the Doppler frequency shift between the received and transmitted signals that is input to an azimuth estimator 72, which also receives an input from the compass 70 which measures a current azimuth. The azimuth estimator 72, based on the estimated Doppler frequency shift and current azimuth measurement, estimates a best azimuth that is displayed to the diver via the display 40 to assist the diver 90 in locating the transmitter 100, i.e., the location of the homing (or SOS) signal.

The reception of an SOS signal is essentially the same as the above-described reception of a homing signal except that the carrier frequency for an SOS signal is not network dependent, but rather, preferably always approximately equal to 40.4 KHz. Upon detection of an in-coming SOS signal, the DSP 20 of the present invention interrupts its then-current operation and gives the highest priority to the SOS signal. The DSP 20 continuously polls its inputs (i.e., signals received by the transducer 60) for an SOS signal and activates an audible alert 80 (see, e.g., FIG. 1) when an SOS signal is detected. As with a homing signal, it is desirable to determine the amount of Doppler frequency shift in a received SOS signal so that the location of the source of the SOS signal may be located.

Figure 13:
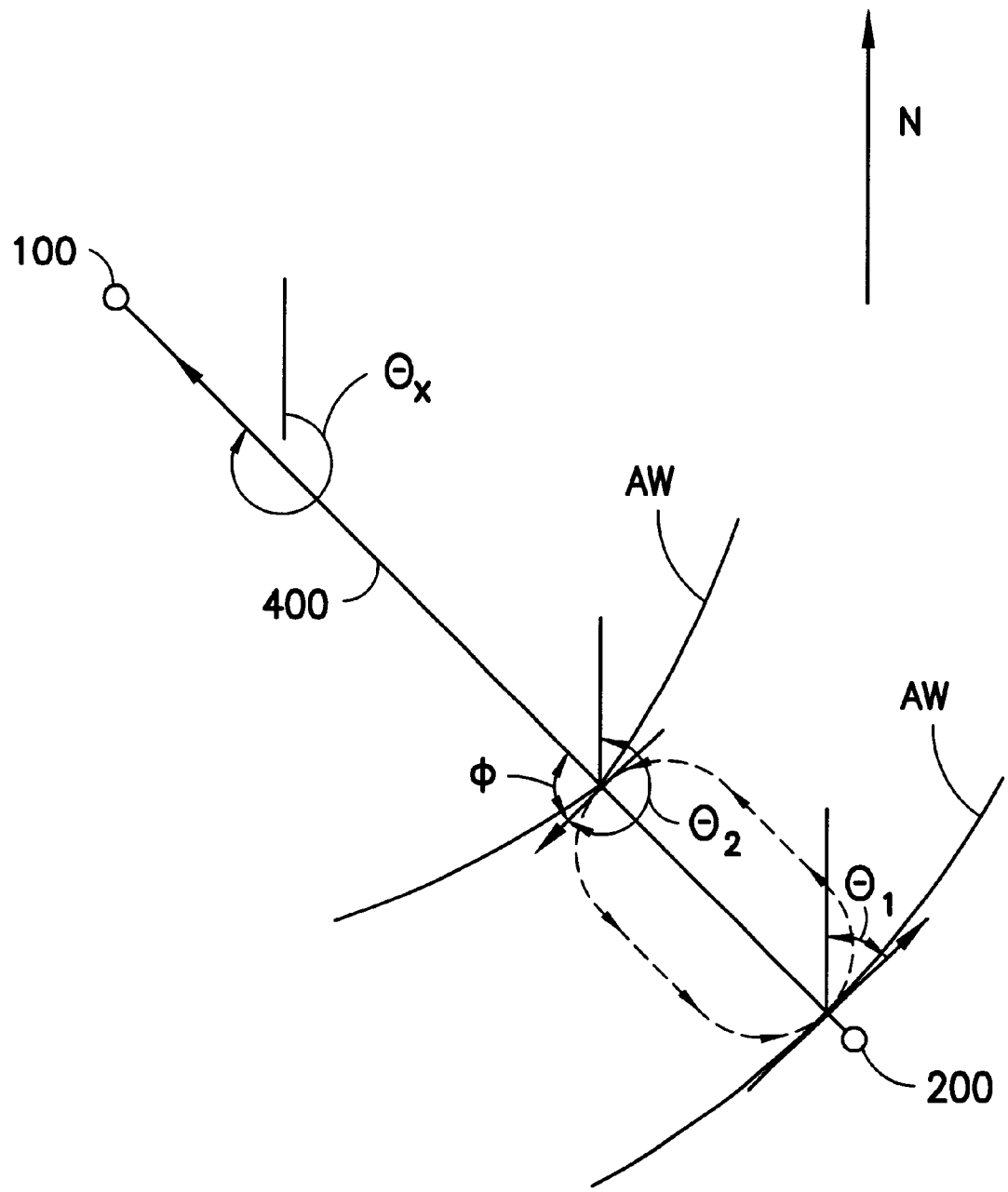
FIG. 13 schematically depicts an acquisition function and process during which a diver traverses a closed-loop in accordance with the present invention.

Once it has been determined that a homing signal or an SOS signal has been received, the device 10 initiates the location process, i.e., acquisition and tracking functions performed, respectively, by acquisition and tracking processes, to determine the location of the transmitter 100 and to enable the diver to swim to that location. To achieve this result, the receiver 200 is initially caused to move along a closed path. For example, and with reference to FIG. 13, the diver 90 activates the acquisition function (which causes the device 10 to carry out the acquisition process) and begins to swim in a circle or to generally navigate a closed-loop. As the diver 90 is so swimming, the receiver 200 crosses acoustical signals transmitted by the transmitter 100 at different angular orientations relative thereto. The frequency of the transmitted signal may experience a frequency shift due to the Doppler effect. As a result, the frequency of the received signal may be frequency-shifted, when compared with the frequency of the transmitted signal. The frequency of the Doppler-shifted signal detected by the receiver 200 may thus vary as the diver 90 navigates the closed-loop. As shown in FIG. 13, the straight line direction between the receiver 200 and the transmitter 100, indicated as 400, is denoted by angle $\theta_x$, measured relative to magnetic North. The acquisition process described below (see, e.g., FIGS. 14 and 17) calculates angle $\hat{\theta}_x$, that is an estimate of $\theta_x$.

The transmitter 100 is considered by the receiver 200 to be generally fixed at a location and not moving. The Doppler frequency shift measured by the receiver 200, in its first approximation (in Mach number), is approximately equal to:

$$\delta f \approx f_o \frac{v}{c_o} \cos\theta \qquad (5)$$

where v denotes the magnitude of the velocity of the receiver 200, $\theta$ denotes the angle between the direction of movement of the receiver 200 and a straight line 400 between the transmitter 100 and the receiver 200, and $c_o$ is the velocity of sound in the water and is approximately equal to 1550 meters per second (m/s).

If the transmitter 100 does move, then the pair (v, $\theta$) denotes the magnitude and angle of the movement of receiver 200 relative to the transmitter 100.

The absolute value of Doppler frequency shift, $|\delta f|$, is less than or equal to $f_{max}$ and is related to the maximal possible equivalent velocity $v_{max}$. For example, for a $v_{max}$ approximately equal to 1 m/sec, $f_{max}$ is approximately equal to 25.8 Hz.

In contrast to the generally stationary or fixed transmitter 100, the receiver 200 may move in space. As a result, the Doppler frequency shift varies with time, denoted by $\delta f(t)$. Variation in Doppler frequency shift may be caused by: (i) variation in the magnitude of the velocity of the receiver 200, v(t); (ii) variation in the angular position of the receiver 200 relative to the transmitter 100, $\theta(t)$, which is preferably specified in degrees azimuth relative to magnetic North; or (iii) both (i) and (ii). The azimuth, relative to magnetic North, of the line between the transmitter 100 and receiver 200 is denoted by $\theta_x$, and an estimated value of $\theta_x$ is denoted by $\hat{\theta}_x$.

The Doppler frequency shift may thus be calculated as follows:

$$\delta f(t) = f_o \frac{v(t)}{c} \cos(\theta_x - \theta(t)) \qquad (6)$$

The DSP 20 periodically determines the current value of $\delta f(t)$ and $\theta(t)$ at sampled time instants, $kT_s$, where $T_s$ is a sampling interval (0.5 sec, for example) yielding $\delta f(k)=\delta f(kT_s)$ and $\theta(k)=\theta(kT_s)$.

From equation (6), and based on a generally stationary transmitter 100 and that the magnitude of the velocity of the receiver 200 is unknown but constant, the Doppler frequency shift $\delta f$ is a maximum value for $\theta(k)=\theta_x$, where k denotes the time instant for which the maximum Doppler frequency shift occurred. Additionally, at angles $\theta_1$ and $\theta_2$, the Doppler frequency shift is zero—these angles are respectively offset by 270° and 90° from $\theta_x$.

Figure 15:
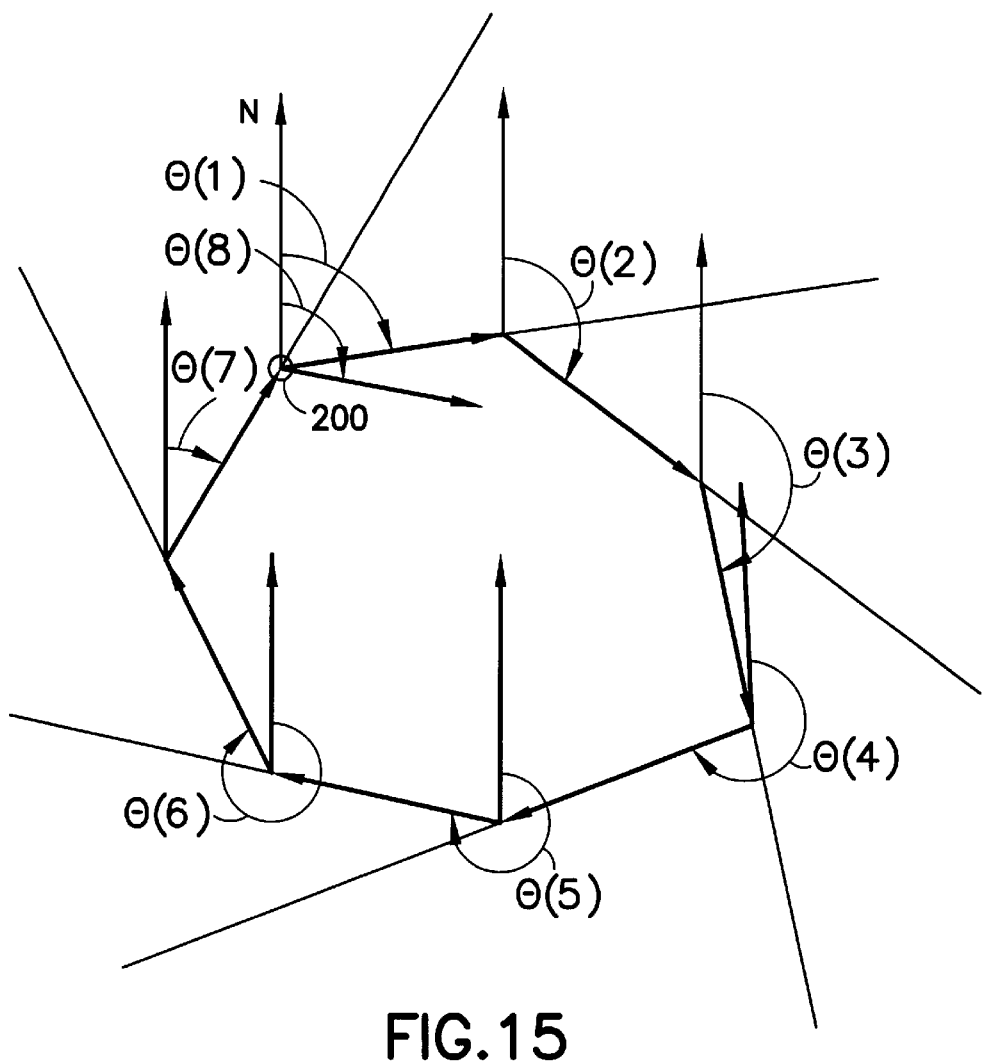
FIG. 15 schematically depicts an acquisition function and process in accordance with the present invention where the receiver had traversed more than a closed-loop.

To summarize, and with reference to FIG. 15, $\theta(k)$ represents the measured azimuth of the receiver 200 in its movement at a time instant, k and as the receiver 200 navigates a closed-loop. For each time instant k, the angle $\theta(k)$ and the Doppler frequency shift $\delta f(k)$ are determined by the receiver 200. If the Doppler frequency shift reaches its maximal value, say for time instant $k_n$, then it may be concluded that $\theta_x=\theta(k_n)$.

The device 10 of the present invention carries out a two stage locating or location process consisting of the acquisition function and the tracking function during which acquisition and tracking processes are respectively performed by the device 10. The acquisition function is used to acquire a location of the transmitter 100 (i.e., where $\hat{\theta}_x$ is determined); whereas, the tracking function is used to minimize deviation from the acquired location during movement of the receiver 200 towards the transmitter 100 (i.e., minimize deviation from $\theta_x$).

Figure 14:
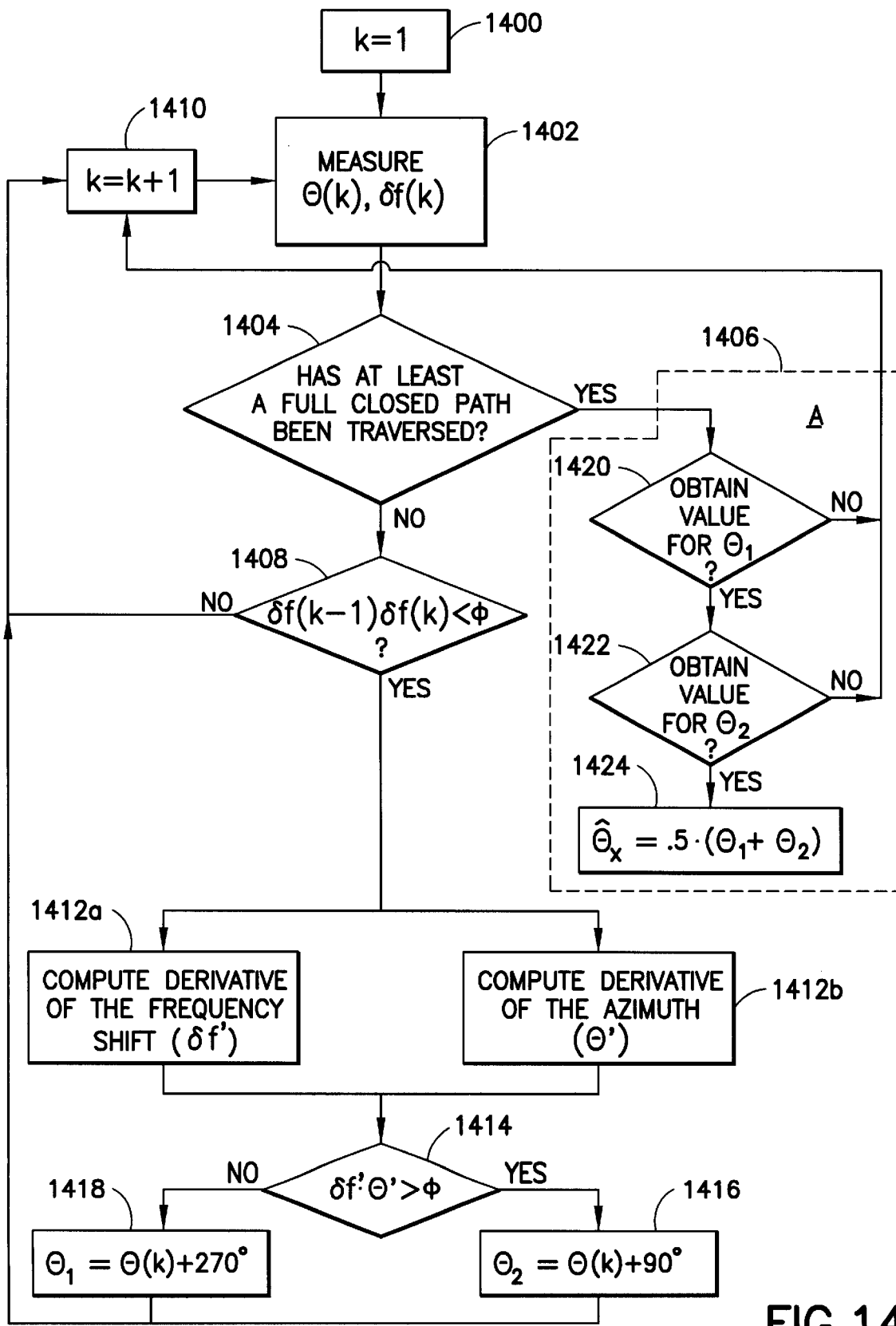
FIG. 14 is a flow chart of an acquisition process for performing the acquisition function in accordance with the present invention.

Referring to FIG. 14, a flow chart of an embodiment of an acquisition process performed by the device 10 (i.e., by the hardware and software of the receiver 200) for the acquisition function of the present invention is there depicted. The acquisition function requires repetitive measurements and thus a counter is preferably utilized to keep track of and identify the data being recorded, as indicated at step 1400, representing a counter with initial integer k. Thus, for example, for an initial measured data point, k=1, for a subsequent data point, k=2, and so on. Any increment in the value of k can be used and/or the increment can be related to the passage of time (e.g., k=0 at initiation, k=4 at 2 seconds with a 0.5 second period, etc.).

Although not depicted in FIG. 14, the receiver 200 is caused to be moved, preferably in a closed-path to acquire the location of the transmitter 100 (see, e.g., FIGS. 13 and 15). The acquisition process depicted by the flow chart of FIG. 14 occurs during the closed-path movement of the receiver 200.

As represented at step 1402, values for angular orientation of the receiver 200 relative to a fixed point ($\theta$) and Doppler frequency shift ($\delta f$) are measured and determined for each k value by the receiver 200, and stored, preferably in memory 22. As designated at step 1402, the kth value of $\theta$ is represented as $\theta(k)$ and, the associated kth value of $\delta f$ is represented as $\delta f(k)$. The $\theta(k)$ is determined by measuring degrees azimuth relative to a fixed point. It is preferred that the fixed point be magnetic North and that the compass 70 be used to measure the degrees azimuth relative thereto. The Doppler frequency shift $\delta f(k)$ may be determined using equation (6), set forth above. To achieve this result, the transmitter 100 transmits an acoustical signal at a fixed frequency which is known to the receiver 200.

At step 1404, the receiver 200 determines whether it has circumvented a closed-path. Specifically, the receiver 200 compares the position of the kth value of the angular orientation $\theta(k)$ with the first measured value of the angular orientation $\theta(1)$ obtained at the initiation of the acquisition process. If the kth value of the angular orientation $\theta(k)$ is at a position greater than or equal to the first measured value of the angular orientation $\theta(1)$ plus 360°, then the receiver 200 has traversed at least a closed-path.

By way of non-limiting example, to specifically illustrate the process of step 1404, reference is made to FIG. 15, wherein the angles $\theta(1)$–(8) are shown. One possible method of determining whether or not a closed-path has been traversed is determined by calculating the difference in degrees azimuth between sequentially acquired angular positions and adding those values to establish a running total. Where the running total exceeds 360°, then the receiver 200, in most instances, has traversed at least a closed-path. To illustrate the calculation of the running total, FIG. 19 sets forth exemplary values based on FIG. 15.

Where the running total of the angular values exceeds 0°/360°, such as occurs from $\theta(6)$ to $\theta(7)$ in FIG. 15, 360° is added to the angular value that is beyond the 0°/360° position, to ensure a proper value is obtained. For example, if 360° was not added to $\theta(7)$, the calculated difference between $\theta(6)$ and $\theta(7)$ would be 299°. This is inaccurate with the receiver 200 moving in a clockwise direction in FIG. 15. The same applies in the counterclockwise direction, where an angular value passes the 0°/360° position. Thus for example, where a change occurs from 30° to 329°, 360° is added to 30° to obtain a difference of 61°. For the special case of where one of the values is at the 0°/360° position, the direction of movement of the receiver 200 will dictate whether 360° should be used or 0°. If the receiver 200 is travelling clockwise, then a value of 360° is assigned for θ(k), and a value of 0° is assigned for θ(k−1). If travelling counter-clockwise, then a value of 0° is assigned for θ(k), and 360° for θ(k−1).

The running total of the example of FIG. 19 is 372° at angular position θ(8), which is greater than 360°. Thus, in the given example, the receiver 200 has traversed a closed-path.

As an alternative to the above-described running total approach, each measured angle θ(2)–θ(8) after θ(1), may be monitored to determine whether or not θ(1) is exceeded either in a clockwise direction or a counter-clockwise direction. As is readily appreciated, to do so, each of the angular positions has to be evaluated relative to θ(1).

If it is determined at step 1404 that a closed-loop had been traversed by the receiver 200, then the acquisition process proceeds to sub-loop A, represented by step 1406, and further discussed below.

If it is determined at step 1404 that a complete closed-loop has not been traversed by the receiver 200, the acquisition process then proceeds to step 1408, at which an evaluation is made to determine if there has been a change in sign in the Doppler frequency shift from one measured angular data point to a later measured angular data point. In particular, the k value of the Doppler frequency shift δf(k) is multiplied by the (k−1) value of the Doppler frequency shift δf(k−1), which is determined earlier in time than the k value. If the product is less than zero, then the two values must have different signs, and a sign change occurred therebetween in time. If the product is greater than zero, then the two values must have had the same sign (positive or negative), and there was no sign change therebetween. A sign change in the value of the Doppler frequency shift indicates that the data points straddle the straight line 400 (see, e.g., FIG. 13) between transmitter 100 and receiver 200. Preferably, the k value and the k−1 value are measured consecutively in time.

If it is determined, at step 1408, that there is no sign change, the acquisition process proceeds to step 1410, the integer k is increased, and steps 1402, 1404, and so on, as described above, are repeated. If it is determined at step 1408 that there is a sign change, the acquisition process continues with steps 1412a and 1412b, wherein the derivatives of the angular orientation and the Doppler frequency shift are calculated.

Thereafter, as represented by step 1414, a product of the derivatives is obtained and compared with zero. The derivatives are calculated as follows:

$$\theta'(k) = \theta(k) - \theta(k-1) \tag{7}$$

and, $$\delta f(k) = \delta f(k) - \delta f(k-1) \tag{8}$$

If the derivatives have different signs, then the product of step 1414 will be less than zero, whereas, if the derivatives have the same sign, then the product of step 1414 will be greater than zero. If the product is greater than zero, the acquisition process proceeds to step 1416 and $\theta_1$ is calculated by adding 90° to θ(k). If the derivatives have different signs, the acquisition process proceeds to step 1418 and $\theta_2$ is calculated by adding 270° to θ(k). After either of the steps 1416 and 1418, the acquisition process proceeds to step 1410, where the counter k is increased by one, and repeats the acquisition process. The process will continue until it is determined that the receiver 200 has traversed at least a closed-loop, and values for both $\theta_1$ and $\theta_2$ have been determined.

Sub-loop A is engaged where the condition of step 1404 is satisfied and it is determined that a closed-loop has been traversed. In sub-loop A, checks are made at steps 1420 and 1422 for values of both $\theta_1$ and $\theta_2$, respectively. As a general matter, where a closed-loop has been traversed, the values $\theta_1$ and $\theta_2$ will have been found. If at least one of the values is missing, the acquisition process will proceed to step 1410, where the counter k will increase by one and additional data gathering is performed. If the values $\theta_1$ and $\theta_2$ have been determined, an estimated direction $\hat{\theta}_x$ towards the transmitter 100 is calculated at step 1424, wherein the two values for $\theta_1$ and $\theta_2$ are averaged. The estimated direction $\hat{\theta}_x$ is in degrees azimuth and found relative to the fixed point, represented by the transmitter 100. For convenience, the receiver 200 can be equipped with a pointer displayable on the display 40 that may indicate the estimated direction $\hat{\theta}_x$ to direct the diver towards the transmitter 100.

The acquisition process depicted by the flow chart of FIG. 14 requires a plurality of iterations, preferably at least two to obtain values for $\theta_1$ and $\theta_2$. Once either of the values $\theta_1$, $\theta_2$ is determined, the acquisition process will continue, until the other value is found. It is possible that the process will repetitively calculate one of the values, before finding the other. If so, the process can cause a previously calculated value to be replaced with a newer calculated value, or, alternatively, an average of all calculated values can be determined.

Figure 17:
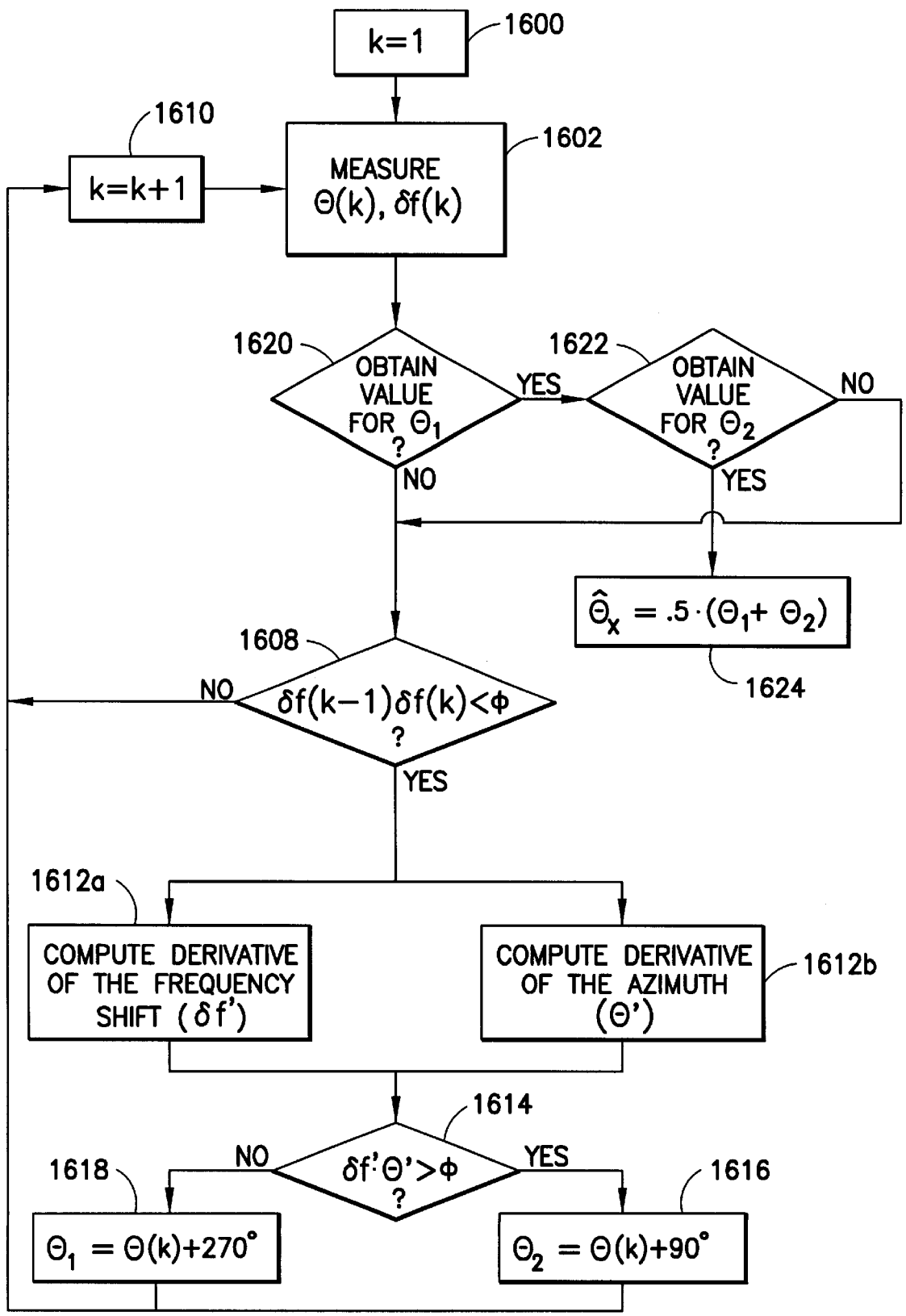
FIG. 17 is a flow chart of an alternative acquisition process for performing the acquisition function in accordance with the present invention.

As an alternative embodiment of the acquisition process, FIG. 17 is a flow chart of an acquisition process that also calculates $\hat{\theta}_x$. The process of FIG. 17 differs from that depicted in FIG. 14 in that no evaluation is made as to whether or not a complete closed-path has been traversed. Rather, the process of FIG. 17 determines, upon each iteration, whether or not both values $\theta_1$, and $\theta_2$ have been determined.

Once the location of the transmitter 100 is acquired, using, for example, the acquisition process depicted in FIG. 14 or FIG. 17, the tracking function may begin, wherein the receiver 200 may be caused to move (by movement of the diver 90) in the estimated direction $\hat{\theta}_x$ towards the transmitter 100. When the receiver 200 is performing the tracking function, the actual direction in which the receiver 200 is moving is continually evaluated by the tracking process (see, e.g., FIG. 18) to ensure there is minimal or no deviation from the estimated direction $\hat{\theta}_x$.

Figure 16:
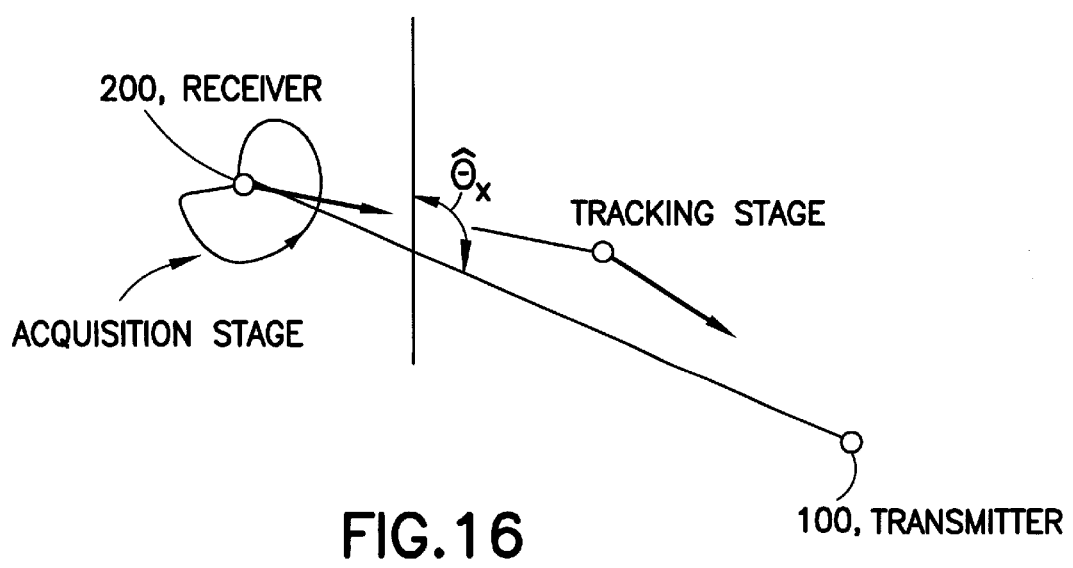
FIG. 16 schematically depicts the adjustment of the azimuth in guiding a diver towards a transmitter when the receiver is carrying out a tracking function and process in accordance with the present invention.
Figure 18:
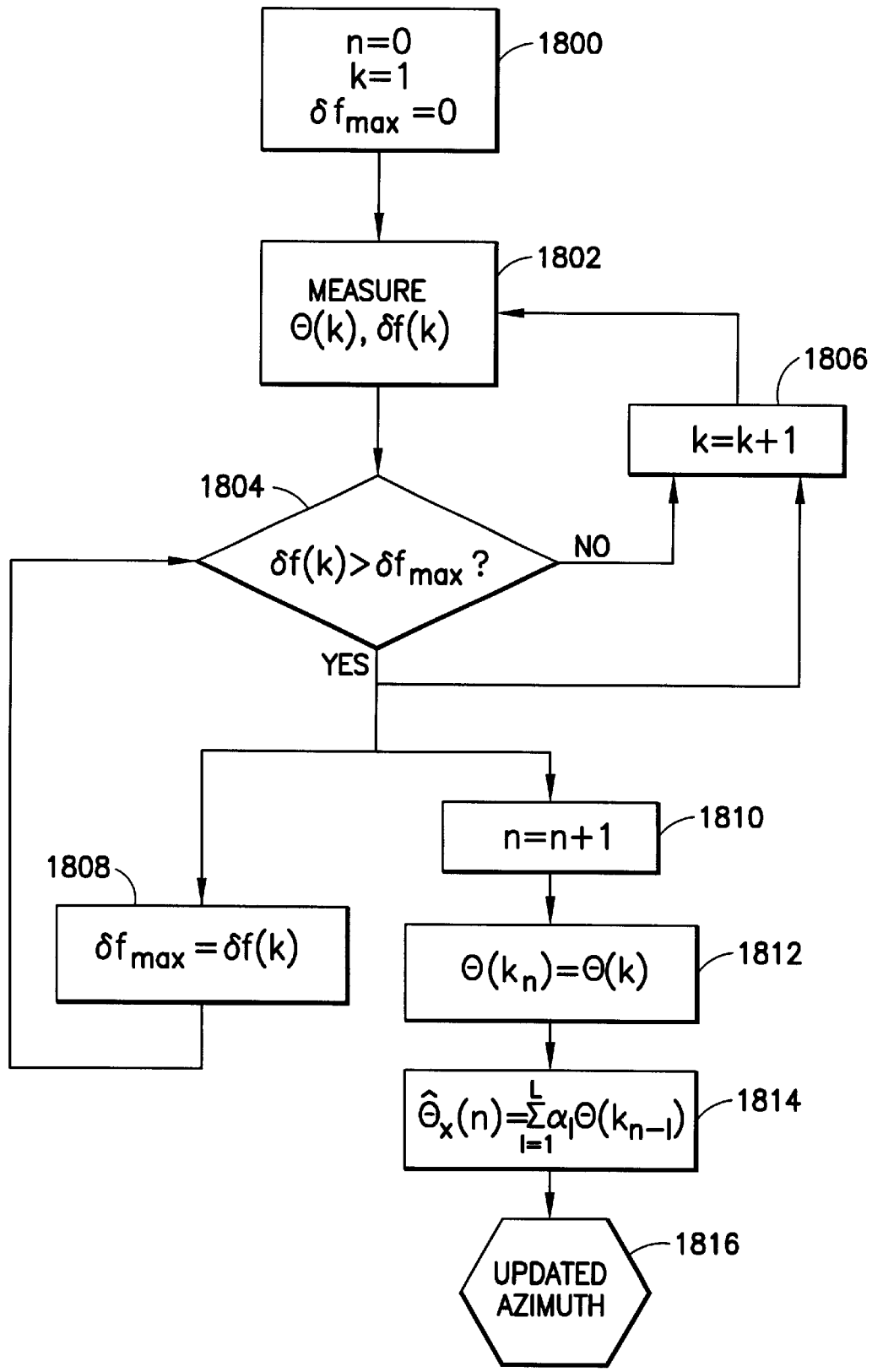
FIG. 18 is a flow chart of a tracking process for performing the tracking function in accordance with the present invention.

FIG. 18 is a flow chart depicting an embodiment of a tracking process performed by the device 10 (i.e., by the receiver hardware and software) for the tracking function in accordance with the present invention. As shown in FIG. 16, the tracking process and tracking function minimize deviation from the estimated direction $\hat{\theta}_x$ between the receiver 200 and the transmitter 100 as the diver 90 swims toward the transmitter 100.

During the tracking process, it is assumed that the magnitude of the velocity of the receiver 200 is constant. However, the actual velocity of the diver need not be known. The tracking process determines the azimuths $\theta(k_n)$ for which the Doppler frequency shift is the largest among all previously determined azimuths, and averages azimuths to determine the best current estimate of $\hat{\theta}_x$, denoted here as $\hat{\theta}_x(n)$, i.e., $$\hat{\theta}_x(n) = \sum_{l=1}^{L} \alpha_l \theta(k_{n-l}) \quad (9)$$

where L denotes the length of the averaging window, and $\alpha_l$ denotes an averaging coefficient.

Specifically, the flow chart of FIG. 18 begins at step 1800, in which initial values for n and k and $\delta f_{max}$ are set to zero. As is in the acquisition process, values of $\delta f(k)$ and $\theta(k)$ are measured, as indicated at step 1802. Thereafter, at step 1804, the value of $\delta f(k)$ is compared with $\delta f_{max}$ to determine which is greater. If $\delta f(k)$ is less than $\delta f_{max}$, then the tracking process proceeds to step 1806, the k value is increased, and the process repeats. If $\delta f(k)$ is greater than $\delta f_{max}$, the tracking process proceeds to steps 1808 and 1810. At step 1808, the value $\delta f_{max}$ is made equal to the value $\delta f(k)$. At step 1810, the value of n is increased by one. Subsequently, at step 1812, the value $\theta(k_n)$ is set equal to $\theta(k)$. At step 1814, the tracking process performs the calculation of equation (9), wherein the average value $\hat{\theta}_x(n)$ is established, and the average value $\hat{\theta}_x(n)$ is made equal to the estimated azimuth $\hat{\theta}_x$ at step 1816. The pointer, or other guide, displayed on the display 40 is updated to re-adjust a preferred direction of travel towards the transmitter 100.

The tracking process are based on the assumption that the magnitude of the velocity of the receiver 200 is constant. Where the magnitude of that velocity actually does vary, the value of the estimated azimuth may also vary. To determine the significance of the variation in velocity, a statistical analysis was performed, comparing the standard deviations of the estimated azimuth versus percentage change in velocity, the results of which are provided in FIG. 20. As may be appreciated from FIG. 20, there is no significant change in azimuth, with relatively significant changes in diver velocity.

Additional features and functionality may be added to the device 10 in accordance with the present invention. For example, different homing signal frequencies may be used within a single network for locating different destinations. For example, a transmitter 100 on a boat can transmit a first homing frequency, whereas, a diver-mounted transmitter 100 can transmit a second homing frequency. In this manner, the receiver 200 can be used to locate both destinations, with the receiver 200 distinguishing the two signals. The receiver 200 may also determine Doppler frequency shift and azimuth based on a predetermined location other than magnetic North. For example, a compass 70 may be calibrated to a reference point other than magnetic North. Readings taken from such a compass 70 would then not be with reference to magnetic North but, instead, to a calibrated (north) reference point.

Operation of the underwater communication device 10 of the present invention will now be discussed. Using various keys 32 on the keypad 30, diver A selects a message from a plurality of predetermined messages for transmission to a particular diver, e.g., diver B, or divers in diver A's network. Once diver A has selected a predetermined message and a diver to receive that message, transmission of that message from diver A's device 10 is achieved by depressing the "SEND" key 32. The intended recipient of diver A's message, diver B, will automatically receive the message transmitted by diver A, as will every other diver in diver A's network. However, only diver B can decode and display diver A's message, as the message included diver B's unique device identification code. The device 10 automatically decodes and displays the received message on the display 40 and activates the audible alert 80. Upon receipt of the message from diver A, diver B's device 10 will automatically generate and transmit an acknowledgement to diver A's device 10 that the message was received. This is possible because the message signal included the unique device identification code for diver A's device 10. In response to reception of diver A's message, diver B can, in any manner similar to that described above for diver A's transmission of a message, transmit a responsive message to diver A.

If diver A transmitted a "response required" message, and no response was received from diver B, diver A can transmit a device control via signal a message signal to automatically cause diver B's device 10 to generate and transmit a locating signal (i.e., either a homing or SOS signal, although an SOS signal is preferred).

When operating in the homing mode, the device 10 receives, via the transducer 60, a homing signal transmitted by a fixed transmitter 100. For example, a transmitter 100 located on a boat, buoy, or other substantial stationary of fixed apparatus or structure, will transmit an acoustical signal (as described above) which is receivable by the device 10. As a homing signal is preferably continuously transmitted, a diver need only activate the homing mode of the device 10 to begin reception of the homing signal. Once so activated, the diver 90 preferably swims in a circle or a closed-loop, during which time the device 10 performs the acquisition process as described above and as depicted in FIGS. 14 or 17. Once an estimated direction toward the transmitter 100 is determined, the device 10 performs the tracking process to ensure that, as the diver 90 swims toward the transmitter 100, he/she does so with minimal deviation from that estimated direction. As the diver 90 swims toward the transmitter 100, the display 40 provides a real-time pointer indicating the preferred direction in which the diver should swim to reach the transmitter 100.

Operation of the inventive device in SOS mode is substantially similar to the above-described homing mode operation. However, a receiving diver 90 need not take any affirmative steps to activate the SOS functionality of the device 10, as that mode is automatically activated upon receipt of an SOS signal.

The various functionality, processes, flow diagrams, circuitry, etc., disclosed herein for the transmitter 100 and receiver 200, and for the acquisition and tracking processes of the present invention are provided as illustrative, non-limiting examples a various embodiments of the inventive device 10. It will be obvious to persons skilled in the art, and from the disclosure provided herein, that various combinations of hardware and software, configured in various ways, may provide the desired functionality and perform the desired processes in accordance with the present invention.

While the acquisition process depicted in FIGS. 14 and 17, and the tracking process depicted in FIG. 18 have been disclosed herein as being performed by various electronic hardware and software provided internal to and external of the DSP 20, it will be obvious to persons skilled in the art, and from the disclosure provided herein, that the acquisition and tracking processes of the present invention may be performed by various other electronic hardware and software. For example, various combinations of electronic hardware and software may be configured and may be suitable for determining a Doppler frequency shift of a received signal, with respect to a transmitted signal. In addition, various combinations of electronic hardware and software may be configured and may be suitable for tracking an azimuth as a diver swims toward a transmitter, as with the present invention. The specific embodiments disclosed and discussed herein are provided as illustrative, non-limiting examples of the present invention, with variations thereto being within the scope and spirit of the present invention.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method of utilizing a receiver to determine a location of a transmitter, said method comprising the steps of:
   (a) transmitting an acoustical signal from the transmitter;
   (b) moving the receiver;
   (c) recording a plurality of angular orientations of the receiver relative to a fixed point during movement of the receiver;
   (d) receiving the acoustical signal by the receiver;
   (e) determining a plurality of frequency shifts of the acoustical signal during movement of the receiver; and
   (f) determining a direction from the receiver towards the location of the transmitter based on the plurality of recorded angular orientations and the plurality of determined frequency shifts.

2. A method as in claim 1, wherein the acoustical signal is transmitted at a substantially fixed frequency known to the receiver.

3. A method as in claim 1, wherein the fixed point is magnetic north.

4. A method as in claim 3, wherein said step (c) further comprises measuring the angular orientation of the receiver relative to magnetic north with a compass.

5. A method as in claim 1, wherein the receiver is operable under water.

6. A method as in claim 5, wherein the transmitter is operable under water.

7. A method as in claim 1, wherein said step (b) comprises moving the receiver along a closed path.

8. A method as in claim 1, wherein each of the plurality of recorded angular orientations is associated with a corresponding one of the plurality of determined frequency shifts.

9. A method as in claim 8, further comprising the steps of:
   calculating a first mathematical product of a first determined frequency shift and a second determined frequency shift, said first determined frequency shift being determined immediately prior to said second determined frequency shift; and
   comparing said first mathematical product to zero.

10. A method as in claim 9, wherein with said first mathematical product being less than zero, said method further comprising the steps of:
    calculating a first derivative for said second determined frequency shift;
    calculating a second derivative for said angular orientation associated with said second determined frequency shift;
    calculating a second mathematical product of said first derivative and said second derivative; and
    comparing said second mathematical product to zero.

11. A method as in claim 10, wherein with said second mathematical product being greater than zero, said method further comprising the step of adding 90 degrees to said angular orientation associated with said second determined frequency shift.

12. A method as in claim 10, wherein with said second mathematical product not being greater than zero, said method further comprising the step of adding 270 degrees to said angular orientation associated with said second determined frequency shift.

13. A method as in claim 1, further comprising the step of transmitting textual messages from the transmitter to the receiver.

14. A method as in claim 1, further comprising the step of transmitting textual messages from the receiver to the transmitter.

15. An electronic underwater device for receiving an acoustical signal transmitted by a transmitter and for determining a location of the transmitter, the transmitted acoustical signal having a predetermined transmit frequency, said device comprising:
    an acoustical receiver for receiving the transmitted acoustical signal;
    a processor coupled to said acoustical receiver for receiving input therefrom and including a frequency detector for detecting a receive frequency of the received acoustical signal, said processor including means for determining a frequency shift between the receive frequency and the predetermined transmit frequency;
    a detector coupled to said processor and for determining an angular orientation of said device relative to a fixed point; and
    a display coupled to said processor;
    said device further comprising means for locating the transmitter based on the determined frequency shift between the received frequency and the predetermined transmit frequency and based on the angular orientation of said device, said device also comprising means for displaying on said display an indication of the location of the transmitter relative to said device.

16. An electronic underwater device as in claim 15, wherein said acoustical receiver is a hydrophone.

17. An electronic underwater device as in claim 15, wherein the transmitted acoustical signal is a homing signal.

18. An electronic underwater device as in claim 15, wherein the transmitted acoustical signal is a SOS signal.

19. An electronic underwater device as in claim 15, wherein said detector is a compass and wherein the fixed point is magnetic north.

20. An electronic underwater device as in claim 17, wherein the predetermined transmit frequency is between approximately 43,160 Hz and 52,760 Hz.

21. An electronic underwater device as in claim 18, wherein the predetermined transmit frequency is approximately equal to 40,400 Hz.

22. An electronic underwater device as in claim 15, wherein the transmitter is located underwater.

23. An electronic underwater device as in claim 15, wherein the transmitter is located above water.

24. An electronic underwater device as in claim 15, wherein said processor further comprises:
    means for determining whether the received transmitted acoustical signal is a message signal or a locating signal;
    means for determining whether a message code in the received transmitted acoustical signal is a remote SOS activation code; and means for causing said device to transmit a SOS signal when said device determines that the message code in the received transmitted acoustical signal is a remote SOS activation code.

25. An electronic underwater device for receiving an acoustical signal transmitted by a transmitter and having a predetermined transmit frequency, said device comprising:

an acoustical receiver for receiving the transmitted acoustical signal;

a processor coupled to said acoustical receiver for receiving input therefrom and including means for determining whether the received acoustical signal is a message signal or a locating signal;

a detector coupled to said processor and for determining an angular orientation of said device relative to a fixed point; and a display coupled to said processor;

said processor including a frequency detector and, when said processor determines that the received acoustical signal is a locating signal, said frequency detector detecting a frequency of the received acoustical signal and said processor including means for determining a frequency shift between the frequency of the received acoustical signal and the predetermined transmit frequency, said device further comprising means for determining a location of the transmitter based on the determined frequency shift between the received frequency and the predetermined transmit frequency and based on the angular orientation of said device, said device also comprising means for causing said display to display an indication of the location of the transmitter relative to said device;

said processor including memory within which is stored a plurality of message identification codes corresponding to a plurality of predetermined textual messages, when said processor determines that the received acoustical signal is a message signal, said processor including means for determining a message code in the received acoustical signal and means for determining a textual message corresponding to the received message code, said device further comprising means for causing said display to display said corresponding textual message.

26. An electronic underwater device as in claim 25, wherein said processor includes means for acknowledging receipt of a message signal to the transmitter.

27. An electronic underwater device as in claim 25, wherein the locating signal is a homing signal.

28. An electronic underwater device as in claim 25, wherein the locating signal is a SOS signal.

29. An electronic underwater device as in claim 25, wherein said detector is a compass and wherein the fixed point is magnetic north.

30. An electronic underwater device as in claim 27, wherein the predetermined transmit frequency of the homing signal is between approximately 43,160 Hz and 52,760 Hz.

31. An electronic underwater device as in claim 28, wherein the predetermined transmit frequency of the SOS signal is approximately equal to 40,400 Hz.

32. An electronic underwater device as in claim 25, wherein the transmitter is located underwater.

33. An electronic underwater device as in claim 25, wherein the transmitter is located above water.

34. An electronic underwater device as in claim 25, wherein said acoustical receiver is a hydrophone.

35. An electronic underwater device as in claim 25, further comprising:

means for determining whether a received message signal contains a remote SOS activation code; and means for causing said device to transmit a SOS signal when said device determines that the message code in the received transmitted acoustical signal is a remote SOS activation code.

36. An electronic underwater device for transmitting an acoustical signal having a predetermined transmit frequency for reception by a user selected receiving device, and for receiving an acoustical signal transmitted by a remote transmitter and having a predetermined receive frequency, said device comprising:

a hydrophone for transmitting and receiving an acoustical signal;

a processor coupled to said hydrophone for providing output thereto and for receiving input therefrom, said processor including a frequency detector for detecting a receive frequency of the received acoustical signal, said processor including means for determining a frequency shift between the receive frequency and the predetermined transmit frequency;

a detector coupled to said processor and for determining an angular orientation of said device relative to a fixed point; and a display coupled to said processor;

said device further comprising means for locating the remote transmitter based on the determined frequency shift between the received frequency and the predetermined receive frequency and based on the angular orientation of said device, said device also comprising means for displaying on said display an indication of the location of the remote transmitter relative to said device.

37. An electronic underwater device as in claim 36, wherein said processor further comprises:

means for determining whether the received acoustical signal is a message signal or a locating signal;

means for determining whether a received message signal contains a remote SOS activation code; and means for causing said device to transmit a SOS signal when said device determines that the message code in the received transmitted acoustical signal is a remote SOS activation code.

38. An electronic underwater device comprising:

an acoustical transmitter and receiver;

a processor coupled to said acoustical transmitter and receiver and comprising:

a transmitter for generating and transmitting an acoustical signal;

a receiver for receiving an acoustical signal transmitted by a remote transmitter;

means for determining if a received acoustical signal is a message signal or a locating signal;

an angular detector coupled to said processor and for determining an angular orientation of said device relative to a fixed point;

a display coupled to said processor;

a frequency detector for detecting a frequency of a received locating signal having a predetermined receive frequency; and means for determining a frequency shift between the frequency of the received locating signal and the predetermined receive frequency;

when said processor determines that the received acoustical signal is a message signal, said processor causing said display to display a predetermined textual message transmitted as the acoustical signal by the remote transmitter;

when said processor determines that the received acoustical signal is a locating signal, said device determining a location of the remote transmitter based on the determined frequency shift between the received frequency of the locating signal and the predetermined receive frequency and based on the angular orientation of said device, said device further comprising means for causing said display to display an indication of the location of the remote transmitter relative to said device.

39. An electronic underwater device as in claim 38, further comprising:

a frequency detector for detecting a frequency of a received locating signal having a predetermined receive frequency; and means for determining if a message signal is a remote SOS message signal and, when said processor determines that the received acoustical signal is a remote SOS message signal, said processor generating and transmitting a SOS signal.

40. An electronic underwater device as in claim 39, wherein the SOS signal has a frequency approximately equal to 40,400 Hz.

41. An underwater communication network comprising a plurality of underwater communication devices, each of said devices comprising:

an acoustical transmitter and receiver;

a processor coupled to said acoustical transmitter and receiver and comprising:

a transmitter for generating and transmitting an acoustical signal;

a receiver for receiving an acoustical signal transmitted by a remote transmitter;

means for determining if a received acoustical signal is a message signal or a locating signal;

an angular detector coupled to said processor and for determining an angular orientation of said device relative to a fixed point;

a display coupled to said processor;

a frequency detector for detecting a frequency of a received locating signal having a predetermined receive frequency; and means for determining a frequency shift between the frequency of the received locating signal and the predetermined receive frequency;

when said processor determines that the received acoustical signal is a message signal, said processor causing said display to display a predetermined textual message transmitted as the acoustical signal by the remote transmitter;

when said processor determines that the received acoustical signal is a locating signal, said device determining a location of the remote transmitter based on the determined frequency shift between the received frequency of the locating signal and the predetermined receive frequency and based on the angular orientation of said device, said device further comprising means for causing said display to display an indication of the location of the remote transmitter relative to each said device.

42. An underwater communication network as in claim 41, wherein each said device further comprises:

a frequency detector for detecting a frequency of a received locating signal having a predetermined receive frequency; and means for determining if a message signal is a remote SOS message signal and, when said processor determines that the received acoustical signal is a remote SOS message signal, said processor generating and transmitting a SOS signal.

43. An electronic underwater communication device for transmitting an acoustical signal and for receiving an acoustical signal from another underwater communication device, said device comprising:

means for transmitting an acoustical signal having a predetermined frequency;

means for receiving an acoustical signal having a receive signal frequency from the another underwater communication device;

means for detecting the receive signal frequency;

means for determining a frequency shift between the receive signal frequency and a predetermined receive signal frequency;

means for determining an angular orientation of said device relative to a fixed point; and means for locating the another underwater communication device based on the determined frequency shift between the receive signal frequency and the predetermined receive signal frequency and based on the angular orientation of said device.

44. An electronic underwater communication device as in claim 43, wherein said transmitting means comprises means for transmitting one of a message signal, a homing signal, and a SOS signal.

45. A personal underwater communication device comprising:

a display;

memory for storing a plurality of messages, each message being assigned a unique message identification code;

a detector for determining an angular orientation of said device relative to a fixed point;

means for selecting one of said messages for transmission by said device and for selecting a receiving device to which a selected message is to be transmitted;

means for producing a string encoding said message identification code, a unique identification code of the transmitting device, and a unique identification code of the user selected receiving device;

means for modulating said string with a predetermined transmit frequency to produce a modulated signal;

means for transmitting said modulated signal as an acoustical signal, and for receiving an acoustical signal having a predetermined receive frequency and transmitted by a transmitter;

means for detecting a frequency of a received acoustical signal;

means for determining a frequency shift between the frequency of the received acoustical signal and the predetermined receive frequency;

means for determining if a received acoustical signal is a message signal or a locating signal;

when said device determines that the received acoustical signal is a locating signal, said detecting means detecting a frequency of the received acoustical signal and said device determining a location of the transmitter based on the determined frequency shift between the received frequency and the predetermined transmit frequency and based on the angular orientation of said device, said device also displaying on said display an indication of the location of the transmitter relative to said device;

when said device determines that the received acoustical signal is a message signal, said device determining a unique message identification code in the received acoustical signal and determining a textual message corresponding to the received unique message identification code, said device displaying on said display said corresponding textual message.

46. A personal underwater communication device as in claim 45, wherein said modulating means comprises a binary frequency-shift-keying (FSK) modulator that modulates said string with a first transmit frequency representing a digital one and with a second transmit frequency representing a digital zero.

47. A personal underwater communication device as in claim 45, wherein said receiving means comprises:

a hydrophone for sensing an acoustical signal;

a pre-amplifier for amplifying the sensed acoustical signal;

a frequency shifter for passing only predetermined frequencies and for converting said passed frequencies to low frequency components; and a low pass filter for passing only said low frequency components.

48. A personal underwater communication device as in claim 47, wherein said demodulating means comprises:

an analog to digital converter for converting each passed low frequency component to a digital value;

a first circuit for adding digital values resulting from frequencies indicating a digital one;

a second circuit for adding digital values resulting from frequencies indicating a digital zero; and a comparator for comparing the results from said first and second circuits to determine whether a digital one or a digital zero is received.

49. A personal underwater communication device as in claim 45, further comprising:

means for transmitting a SOS signal;

means for receiving a SOS signal; and means for alerting that a SOS signal has been received.

50. A personal underwater communication device as in claim 49, wherein said transmitting means comprises:

means for producing a string encoding a SOS signal and including a unique identification code of said device; and means for modulating said string with a predetermined modulating frequency to produce a modulated SOS signal.

51. A personal underwater communication device as in claim 49, wherein said receiving means comprises:

means for receiving an acoustical modulated SOS signal having a predetermined frequency; and means for demodulating said modulated SOS signal to produce a demodulated SOS string.

52. A personal underwater communication device as in claim 45, wherein said plurality of messages stored in memory comprise a general message, an acknowledgment of receipt message, a SOS message, and an instructive message for a user of said device.

53. A personal underwater communication device as in claim 52, wherein an acknowledgment of receipt message is sent automatically by said device to a transmitting device upon receipt of a message from the transmitting device.

54. An underwater communication device as in claim 52, wherein said plurality of messages stored in memory further comprise a message for instructing a receiving device to transmit a SOS message.

55. An underwater communication device as in claim 54, further comprising means for initiating the transmission of the SOS message upon receipt of a message instructing to transmit the SOS message.

56. An underwater communication device as in claim 45, wherein said selecting means comprises a keypad.

57. An underwater communication device as in claim 45, wherein said transmitting and receiving means comprises a hydrophone.

58. An underwater communication device as in claim 45, wherein said displaying means comprises a liquid crystal display.

* * * * *